US011459049B2

(12) United States Patent
Main et al.

(10) Patent No.: US 11,459,049 B2
(45) Date of Patent: *Oct. 4, 2022

(54) BICYCLE SEATS

(71) Applicant: XSENSOR Technology Corporation, Calgary (CA)

(72) Inventors: Ian Main, Calgary (CA); Maxence Petit, Le Maisnil (FR)

(73) Assignee: XSENSOR Technology Corporation, Calgary (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/338,530

(22) Filed: Jun. 3, 2021

(65) Prior Publication Data
US 2021/0331758 A1 Oct. 28, 2021

Related U.S. Application Data

(63) Continuation of application No. 16/590,226, filed on Oct. 1, 2019, now Pat. No. 11,052,958.

(60) Provisional application No. 62/740,348, filed on Oct. 2, 2018.

(51) Int. Cl.
*B62J 1/00* (2006.01)
*B62J 1/08* (2006.01)

(52) U.S. Cl.
CPC .................................... *B62J 1/08* (2013.01)

(58) Field of Classification Search
CPC ..... B62J 1/005; B62J 1/08; B62J 1/002; B62J 1/007; B62J 1/00; B62J 1/10
See application file for complete search history.

(56) References Cited

U.S. PATENT DOCUMENTS

| | | | |
|---|---|---|---|
| 4,089,559 A | 5/1978 | Prange et al. |
| 4,512,608 A | 4/1985 | Erani |
| 4,541,668 A | 9/1985 | Rouw |
| 4,877,286 A | 10/1989 | Hobson et al. |
| 5,108,076 A | 4/1992 | Chiarella |
| 5,356,205 A | 10/1994 | Calvert et al. |
| 5,670,232 A | 9/1997 | Olin |
| 5,863,094 A | 1/1999 | Endo |
| 6,209,954 B1 | 4/2001 | Bombardier |

(Continued)

FOREIGN PATENT DOCUMENTS

WO    WO 2009/040771 A1    4/2009

OTHER PUBLICATIONS

Cycling Weekly, "Prologo Nago Evo Ti 1.4 .English Pound. 100," Jan. 1, 1970, two pages [Online] [Retrieved on Dec. 10, 2019] Retrieved from the Internet <URL: https://www.cyclingweekly.com/reviews/saddles-seat-posts/prologo-nago-evo--ti-1-4-100>.

(Continued)

*Primary Examiner* — Shin H Kim
(74) *Attorney, Agent, or Firm* — Fenwick & West LLP

(57) ABSTRACT

A seat for a pedal-powered vehicle includes a support frame, a left seat element, a right seat element, and a nose. The left and right seat elements and the nose are implemented as separate components supported by the support frame. The two seat elements support a seated rider's weight while the nose does not. The seat elements and the nose form a gap below the seated rider's perineum area. The seat elements pivot forwards and backwards when the seated rider is pedaling. The seat elements counter-pivot when the seated rider is pedaling. Each seat element includes a concave surface that supports the seated rider.

20 Claims, 23 Drawing Sheets

(56) References Cited

U.S. PATENT DOCUMENTS

| | | | |
|---|---|---|---|
| 6,357,825 | B1 | 3/2002 | Bavaresco |
| 6,761,400 | B2 | 7/2004 | Hobson |
| 7,249,800 | B2 | 7/2007 | Jalkanen |
| 9,321,496 | B2 | 4/2016 | Curless |
| 9,493,203 | B2 | 11/2016 | Portz |
| 9,663,166 | B2 | 5/2017 | Hamel |
| 9,745,010 | B2 | 8/2017 | Bailie et al. |
| 9,821,867 | B2 | 11/2017 | Goff |
| 10,106,217 | B1 | 10/2018 | Hsu |
| 10,618,583 | B1 | 4/2020 | Marc |
| 2004/0004375 | A1 | 1/2004 | Garland et al. |
| 2004/0174051 | A1 | 9/2004 | Scholz |
| 2006/0255631 | A1 | 11/2006 | Ljubich |
| 2012/0286548 | A1 | 11/2012 | Bailie et al. |
| 2015/0035326 | A1 | 2/2015 | Wong et al. |
| 2015/0130234 | A1 | 5/2015 | Bailie et al. |
| 2015/0251717 | A1 | 9/2015 | Portz |
| 2016/0068212 | A1 | 3/2016 | Hamel |
| 2016/0144914 | A1 | 5/2016 | Jay |
| 2016/0167726 | A1 | 6/2016 | Dudley, II |
| 2017/0073028 | A1 | 3/2017 | Petty |
| 2017/0233020 | A1 | 8/2017 | Goff |
| 2018/0057089 | A1 | 3/2018 | Toll |
| 2020/0102033 | A1 | 4/2020 | Main et al. |

OTHER PUBLICATIONS

Kuvo-Tec, "Planches Usinables," Date Unknown, one page [Online] [Retrieved on Dec. 10, 2019] Retrieved from the Internet <URL: http://www.kuvotec.com/nos-produits/planches-usinables/index.html>.

Kuvo-Tec, "PU-120-RE," Date Unknown, one page [Online] [Retrieved on Dec. 10, 2019] Retrieved from the Internet <URL: http://www.kuvotec.com/nos-produits/resines-a-couler/pu-120-re/index.html->.

The National Industrial Property of France, Office Action, FR Patent Application No. FR1910911, dated Jan. 28, 2021, 15 pages.

youtube.com, "Les muscles de la cuisse : les ischio-jambiers," Feb. 29, 2012, one page [Online] [Retrieved on Dec. 10, 2019] Retrieved from the Internet <URL https://www.youtube.com/watch?v=YBIOm_DBQ48>.

PCT International Search Report and Written Opinion, PCT Application No. PCT/IB2021/058747, Feb. 4, 2022, 12 pages.

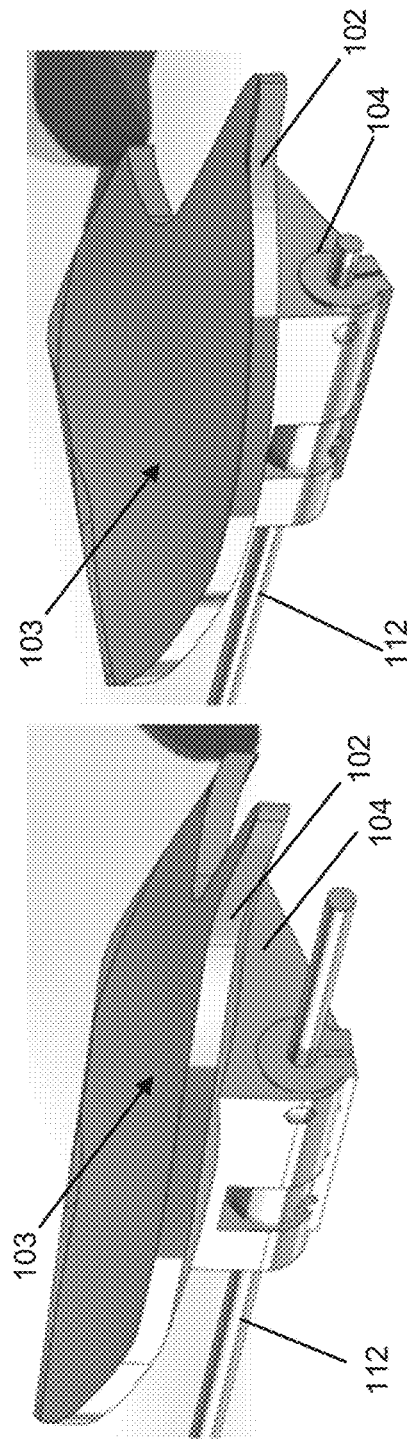
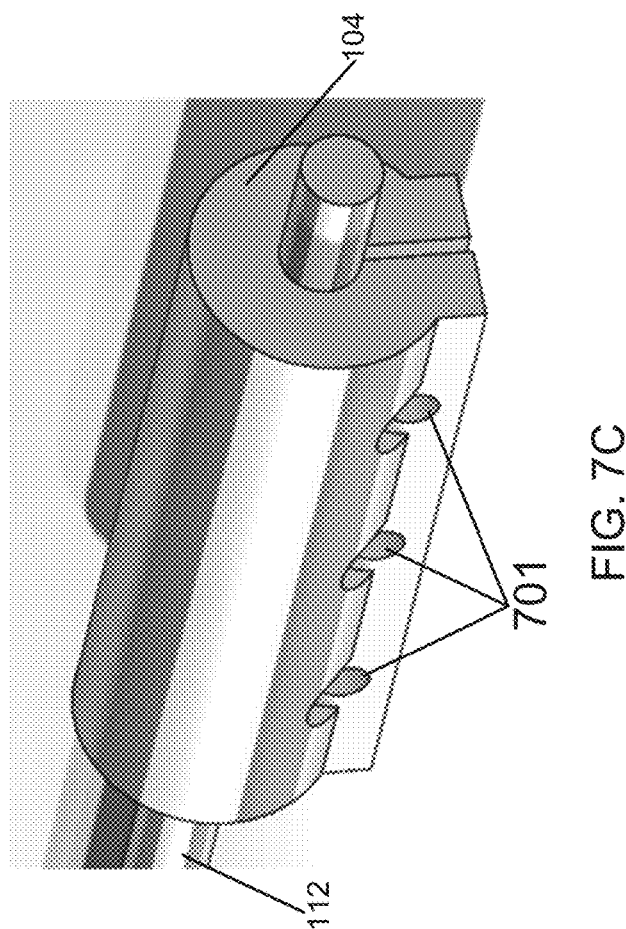
FIG. 7A  FIG. 7B  FIG. 7C

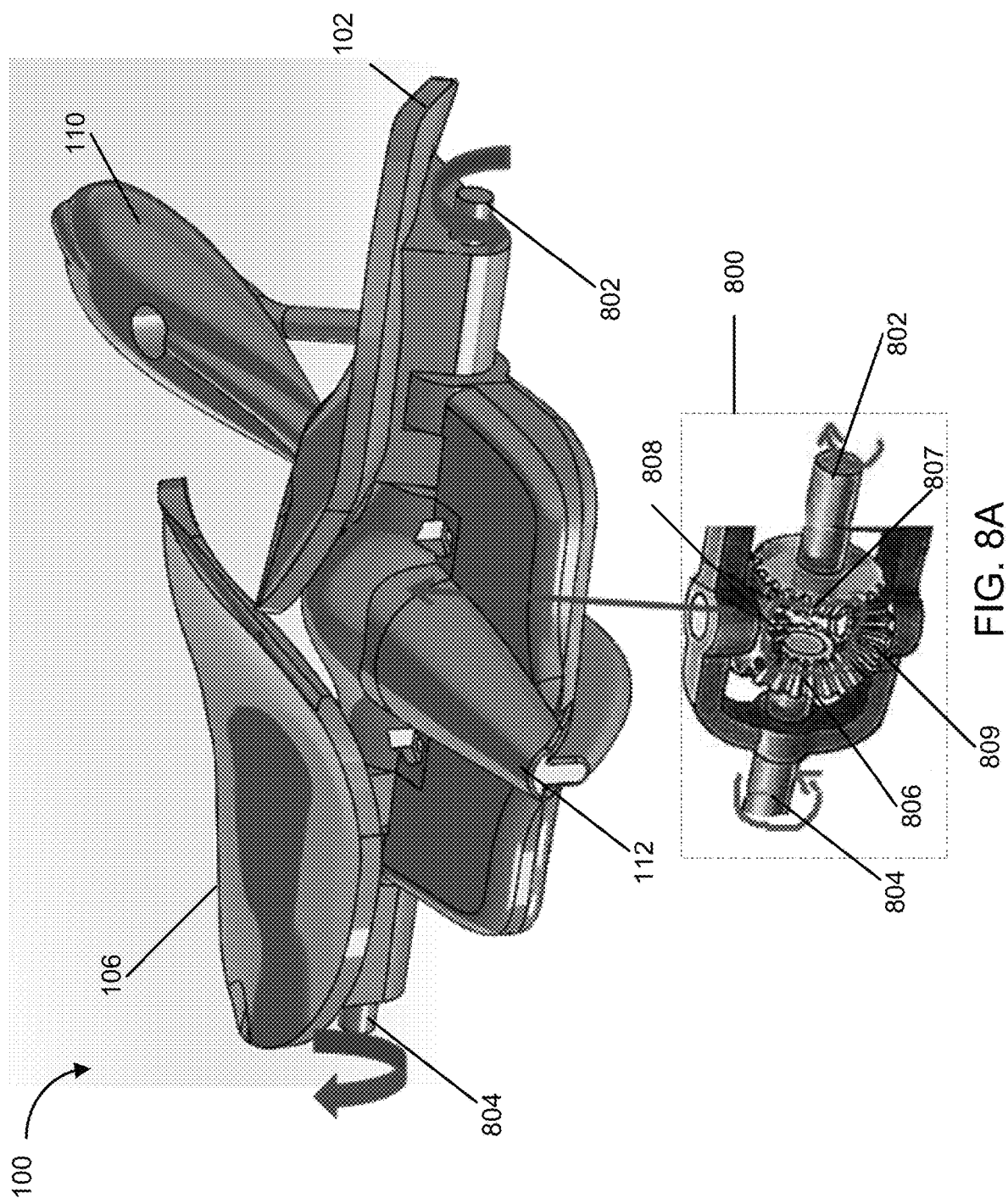

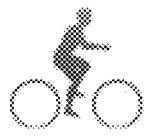
FIG. 11A
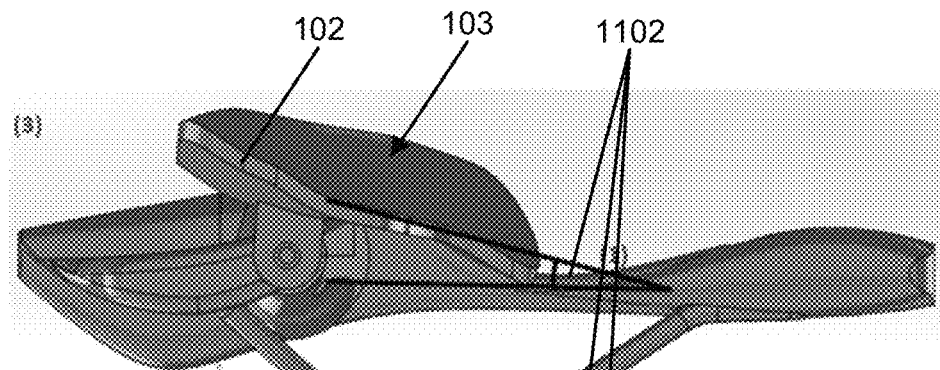
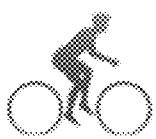
FIG. 11B
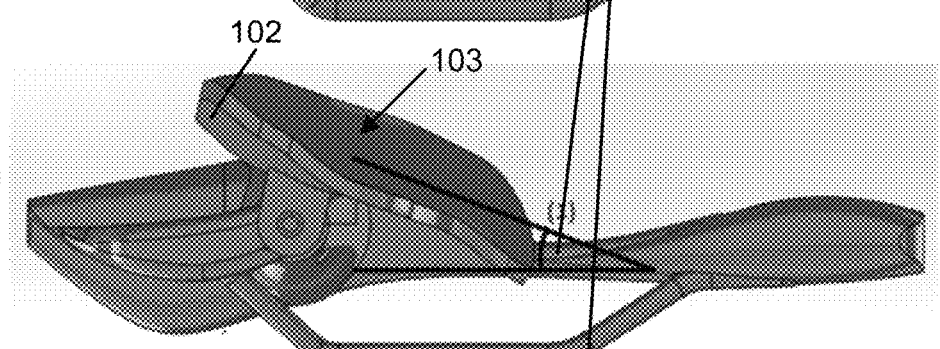
FIG. 11C
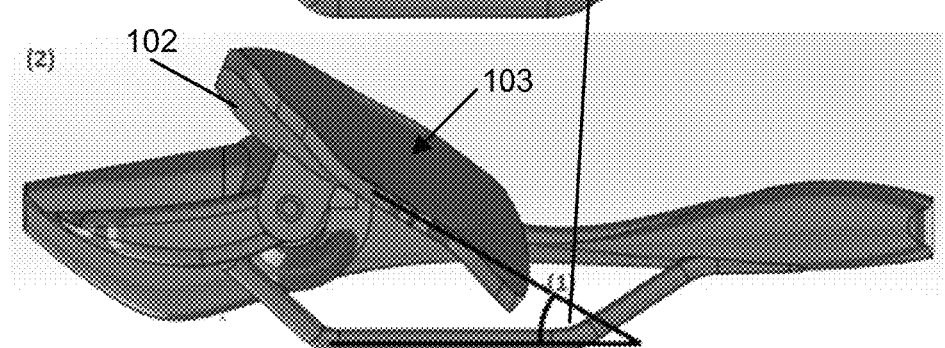

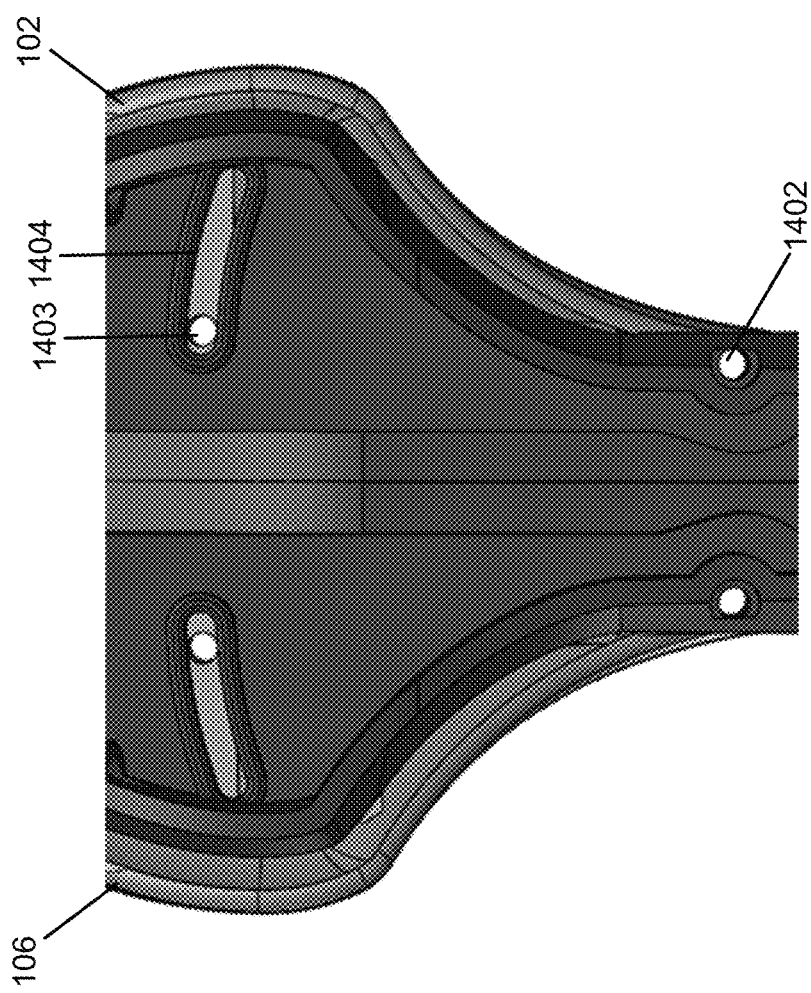
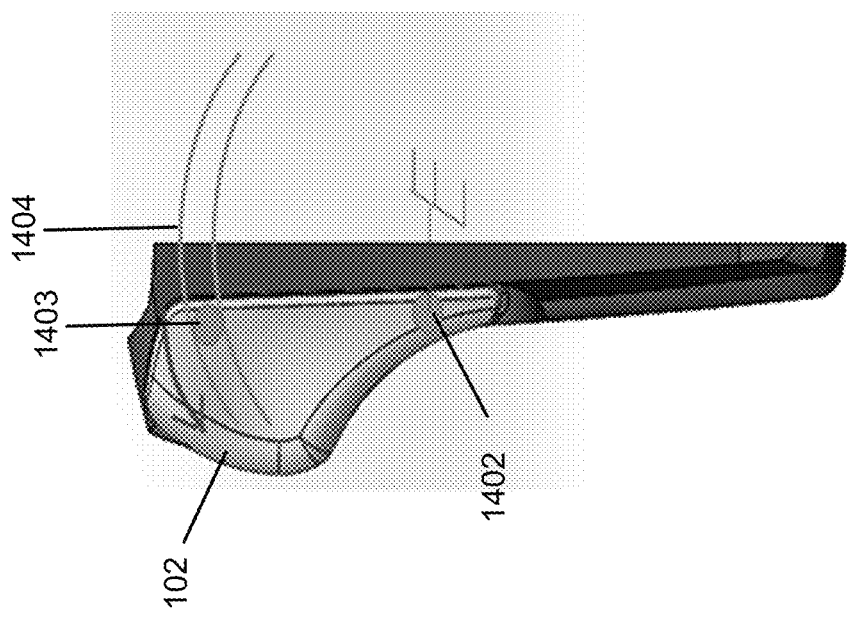
FIG. 14B
FIG. 14A

BICYCLE SEATS

CROSS REFERENCE TO RELATED APPLICATIONS

This application is a continuation application of U.S. patent application Ser. No. 16/590,226, filed Oct. 1, 2019, which claims the benefit of U.S. Provisional Patent Application No. 62/740,348, filed Oct. 2, 2018, both of which are hereby incorporated by reference in their entirety.

BACKGROUND

1. Field of the Invention

This invention relates generally to bicycle or other pedal-powered vehicle seats, and more specifically, to bicycle seats that are both comfortable and supportive.

2. Description of the Related Art

Standard bicycle seats are not well designed for the human body. Sitting on a bicycle seat compresses tissues and organs and restricts blood flow in the perineum area. Excessive pressure on the ischia tuberosties (IT's or "sit bones") causes discomfort over prolonged periods of time. Seats that are convex also tend to apply pressure and separation forces to the pelvic bones. The static nature of these seats causes chafing and friction at the transition between a body and a seat. All of these issues cause both comfort and potentially long term medical issues to cyclists.

SUMMARY OF THE DISCLOSURE

Described herein are bicycle seats that improve rider comfort. The bicycle seats increase the seat support surface area to redistribute pressure and minimize peak pressure points, while allowing the body and legs to move freely in a motion that promotes optimum biomechanics and power transmission to the pedals of the bike. Compared to conventional bicycle seats, bicycle seats described herein have a larger and more contoured (cupped in a convex surface) surface area that provides a greater pressure redistribution. In various embodiments, the seat surfaces of the separate seat elements rotate in opposite directions for added stability.

BRIEF DESCRIPTION OF THE DRAWINGS

The invention has other advantages and features which will be more readily apparent from the following detailed description of the invention and the appended claims, when taken in conjunction with the accompanying drawings, in which:

FIGS. 7A-7C illustrate adjusting a seat element, according to one embodiment.

FIGS. 8A-8B illustrate a differential for counter-pivoting seat elements, according to one embodiment.

FIGS. 11A-11C illustrate adjusting a tilt of a seat element, according to one embodiment.

FIGS. 14A-14E illustrate adjusting a seat element, according to one embodiment.

DETAILED DESCRIPTION OF THE DISCLOSURE

Figure 1:
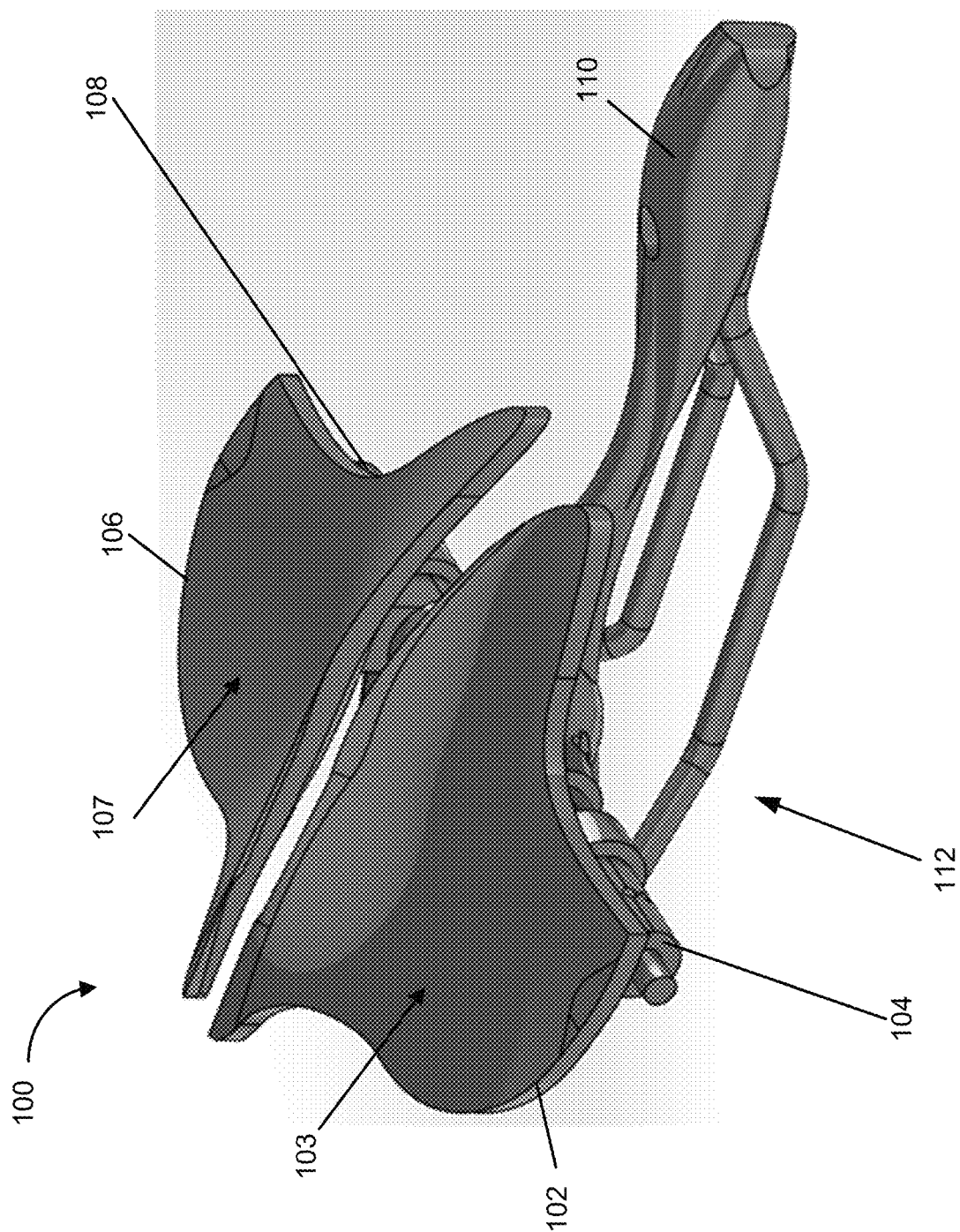
FIG. 1 is a perspective view of an example bicycle seat, according to one embodiment.

FIG. 1 is a perspective view of an example bicycle seat 100, according to one embodiment. The illustrated bicycle seat 100 includes seat elements 102, 106, a nose 110, and a support frame 112. The seat elements 102, 106 as well as the nose 110 are separate and supported by the support frame 112. The seat element 102 (106) has a surface 103 (107). The seat element 102 (106) includes a pivot 104 (108) that connects the seat element 102 (106) to the support frame 112. The seat elements 102, 106 pivot forwards and backwards relative to the support frame 112. The support frame 112 includes a seat adjustment mechanism (not shown) and a seat transmission mechanism (not shown). The seat adjustment mechanism allows adjustment of the separation between the seat elements 102, 106 to accommodate anatomy of different users. The seat transmission mechanism rotates the seat elements 102, 106 in opposite directions. The seat elements 102, 106 support a seated rider's weight while the nose 110 does not. The nose 110 provides lateral stability, for example if the rider is standing while pedaling or during cornering or aggressive maneuvers. The nose 110 preferably is strong enough to support the rider's weight, at least for short periods of time. All components are further described below.

Seat Surfaces

Figure 2A:
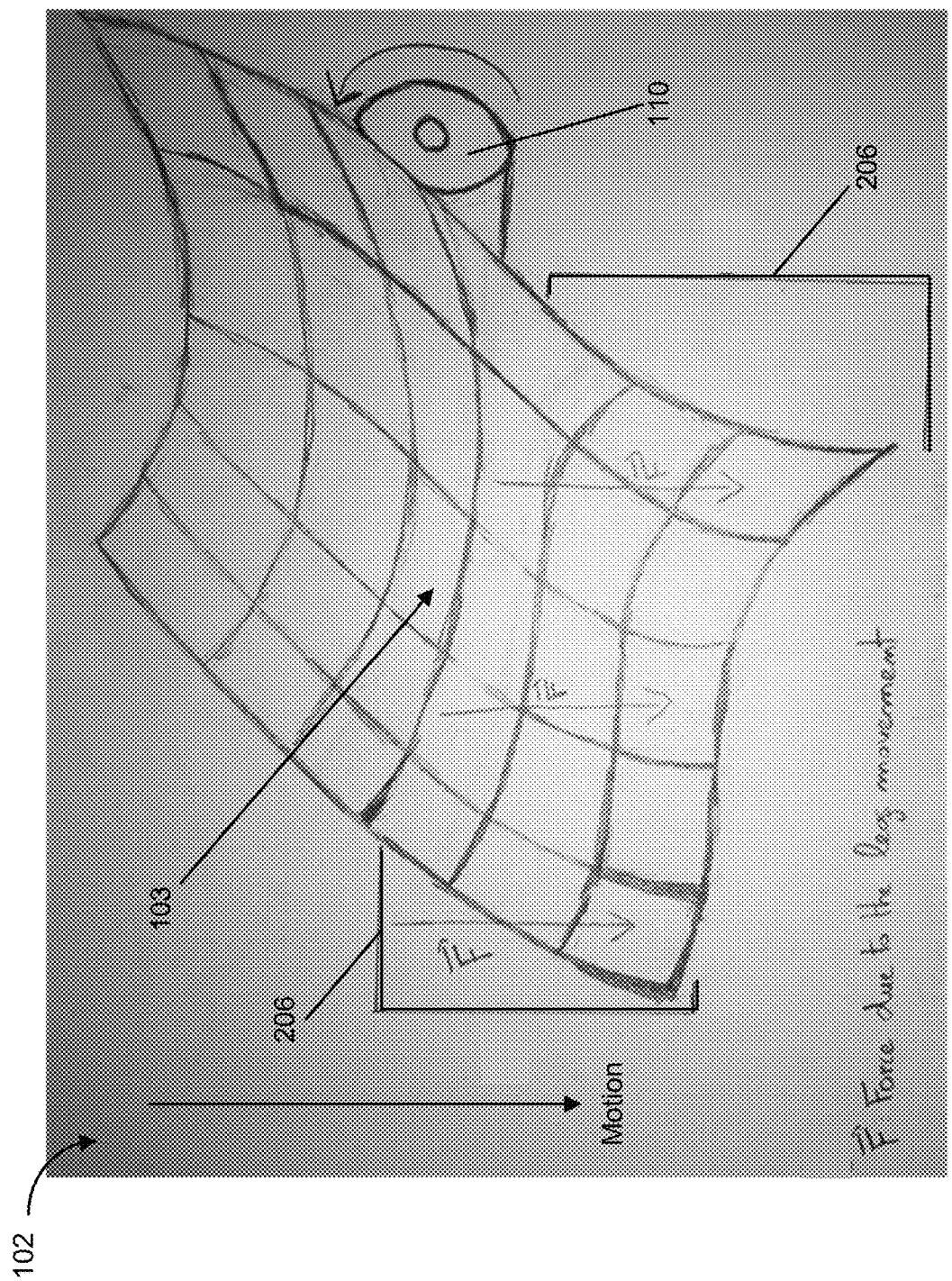
FIG. 2A is a perspective view of a surface of the seat element, according to one embodiment.
Figures 3A, 3B:
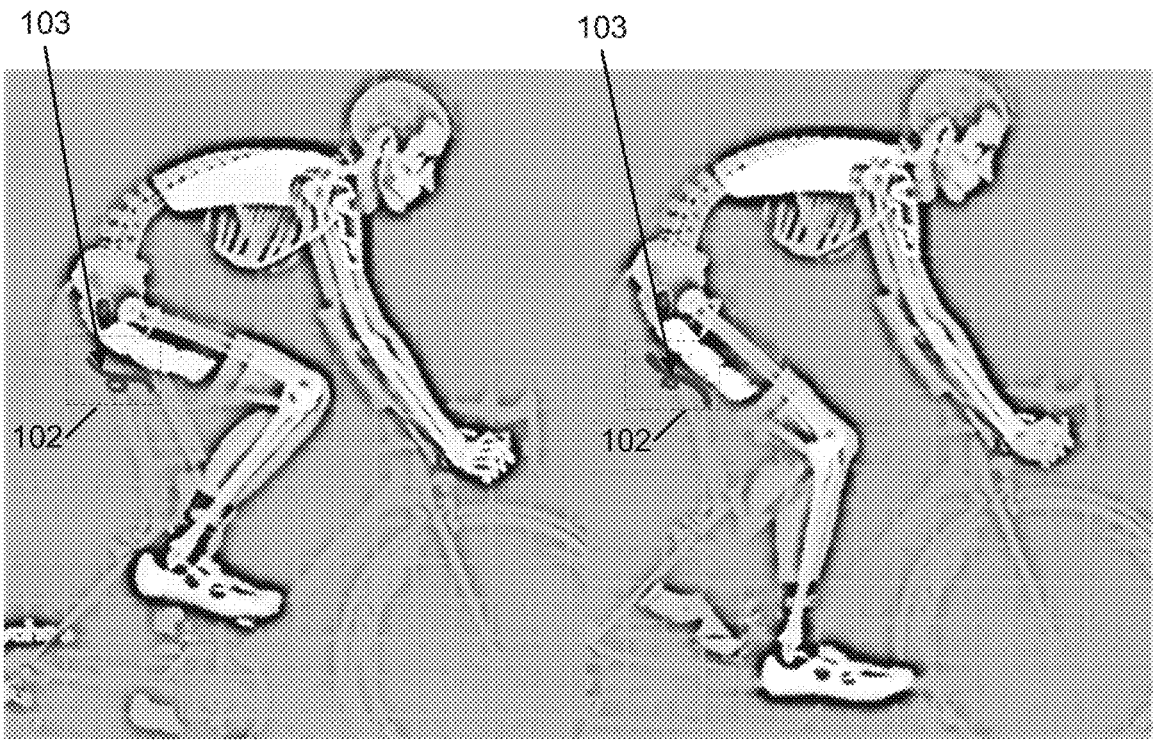
FIGS. 3A-3D illustrate a seat element pivoting during a bike ride, according to one embodiment.
Figures 3C, 3D:
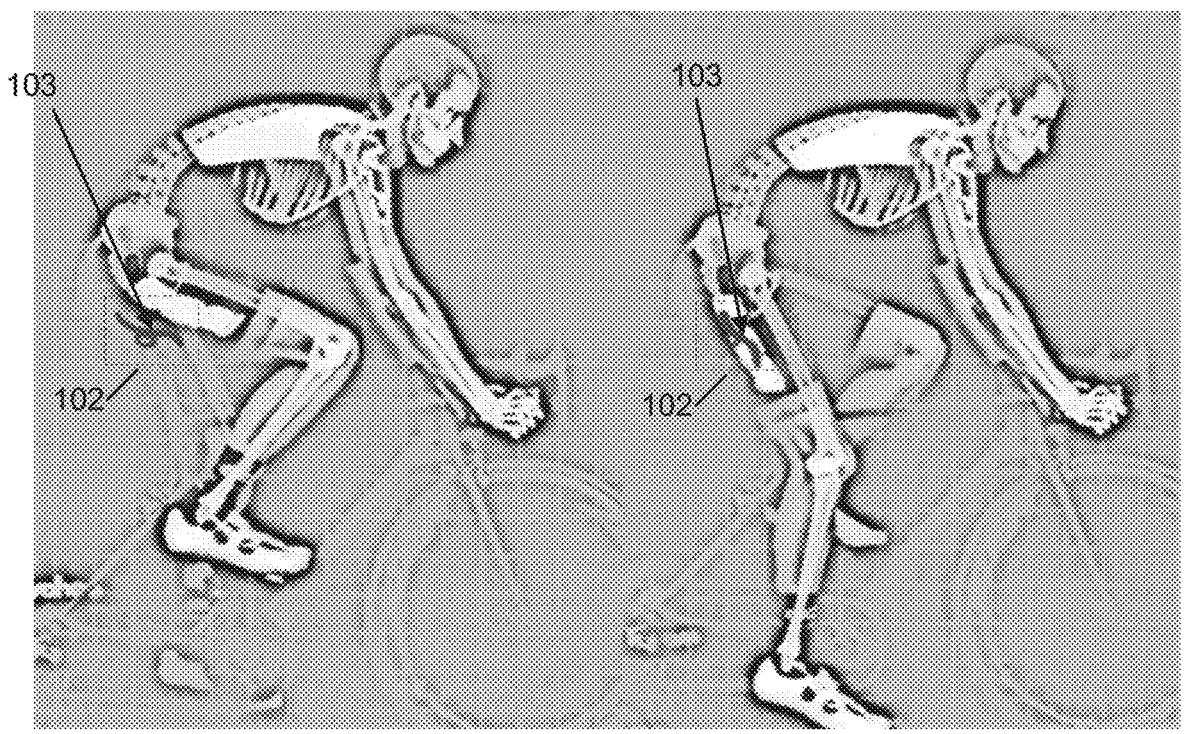
Figure 3E:
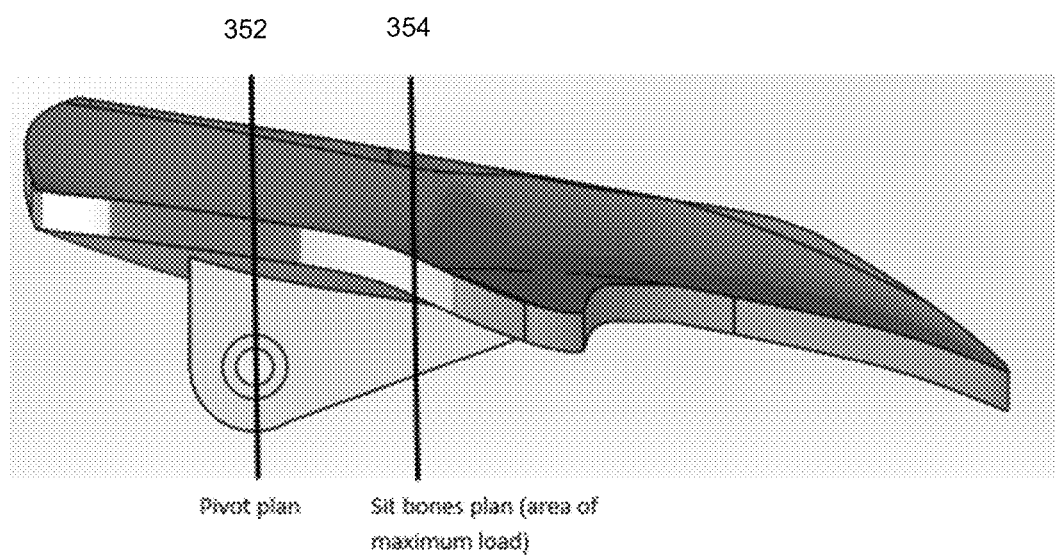
FIG. 3E illustrates a position of a pivot axis of the seat element, according to one embodiment.

The seat element 102 (106) has an ergonomically contoured surface 103 (107). FIG. 2A is a perspective view of a surface of the seat element 102, according to one embodiment. As illustrated, the seat surface 103 is concave shaped and provides support to a rider seated on the seat element 102. The terms "rider" and "user" are used interchangeably herein. Compared to convex or flat seat surfaces, the concave surface 103 provides increased surface area to reduce surface pressure that causes discomfort from prolonged sitting. The motion of the hips and legs causes the seat element 102 to pivot forwards and backwards relative to the support frame thereby to maintain maximum surface contact for consistent pressure relief. For example, as illustrated in FIGS. 3A through 3D, the seat element 102 pivots forwards and backwards such that the surface 103 maintains contact with a rider's hip and leg area. FIGS. 3A through 3D illustrate different phases of a riding cycle. To improve the seat pivoting, the pivot axis can be placed behind a seated rider's center of gravity. The center of gravity is typically located in the area of maximum load or the location of the IT. One example is illustrated in FIG. 3E. The pivot axis 352 is behind the sit bone position 354.

To provide comfort and support, the seat elements preferably provide larger contact areas with the rider. Because the seat elements pivot as the rider is pedaling, the seat elements can be made in dimensions that would interfere with a rider's pedaling if the seat elements did not pivot. In some designs, the seat element has an edge-to-edge length of at least 60 mm, and an edge to edge width of at least 120 mm (across both seat elements).

Referring back to FIG. 2A, the surface 103 is elongated at the front surface with a progressively softer leading edge 206 that allows for more surface area, and better contact with the seat to assure rotation. Without this softer transition area on the thigh, high cadence rotation/oscillation of the seat is not as effective. This zone also reduces the stress line at the front of the seat surface for more comfort. A seat element may be attached with a seat padding that provides grip and additional comfort as well as stability. One example is illustrated in FIG. 2B.

Figure 2B:
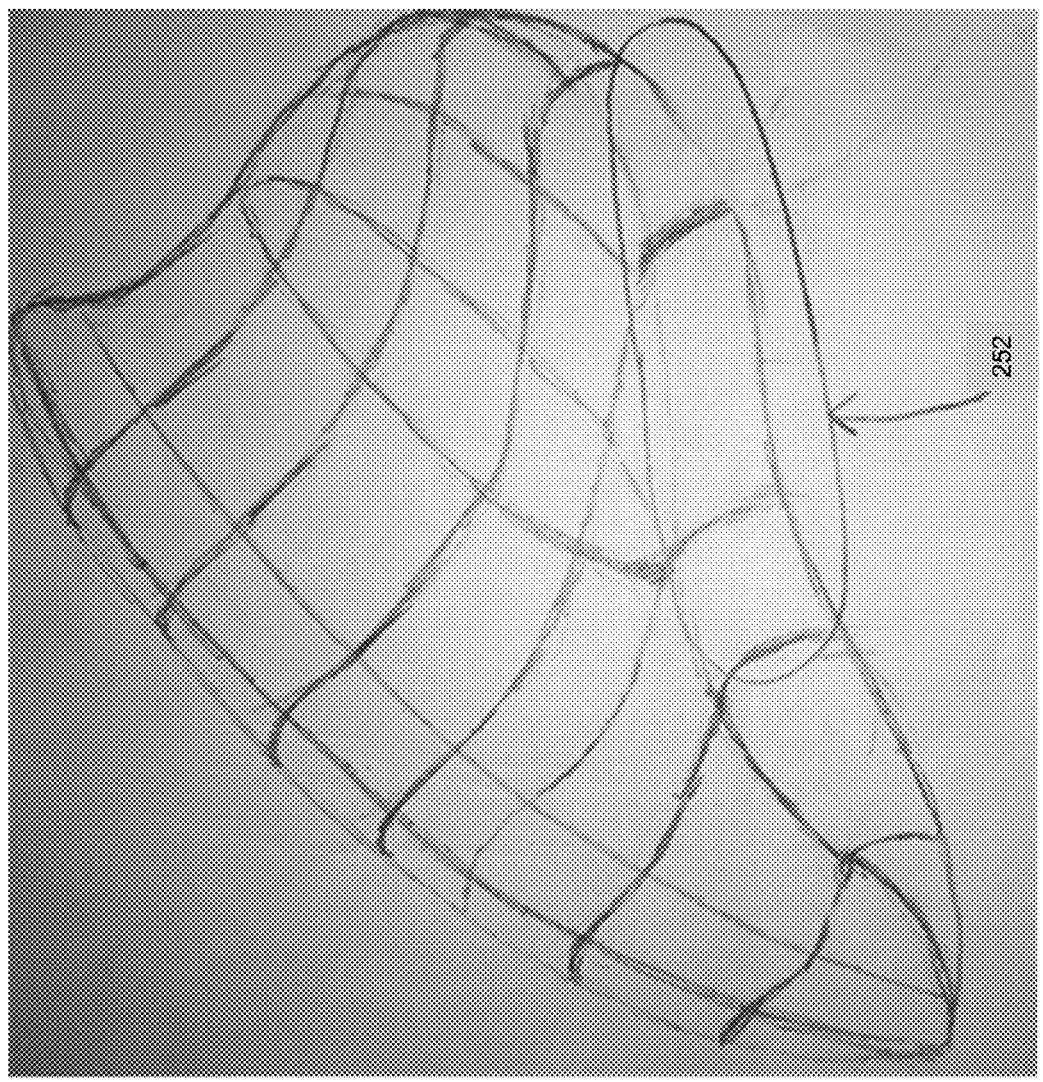
FIG. 2B is a perspective view of a seat padding, according to one embodiment.

FIG. 2B is a perspective view of a seat padding 250, according to one embodiment. The seat padding 250 can be attached to and/or detached from a seat element. Different seat padding may be used for different morphology, gender and types of cyclists. The seat padding 252 holds and stabilizes the user from sliding forward during forward rotation, especially at the transition area 252 between gluteus maximus and the hamstring muscle. The seat padding 252 preferably does not interfere with the hamstring muscle or tendon.

Adjustment of Seat Elements

Figure 4A:
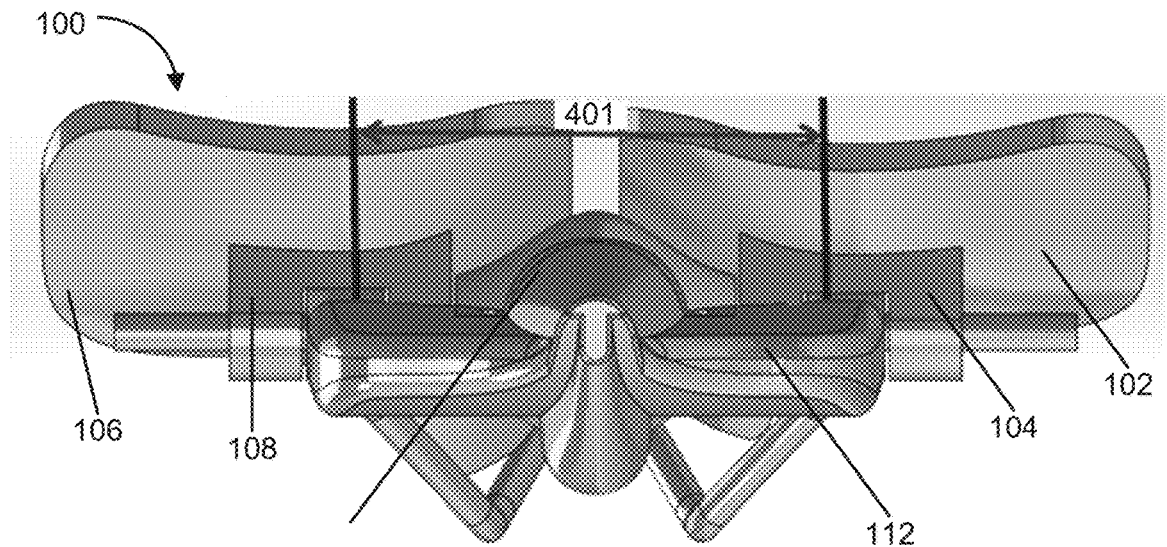
FIGS. 4A and 4B are a perspective view of an example seat, according to one embodiment.
Figure 4B:
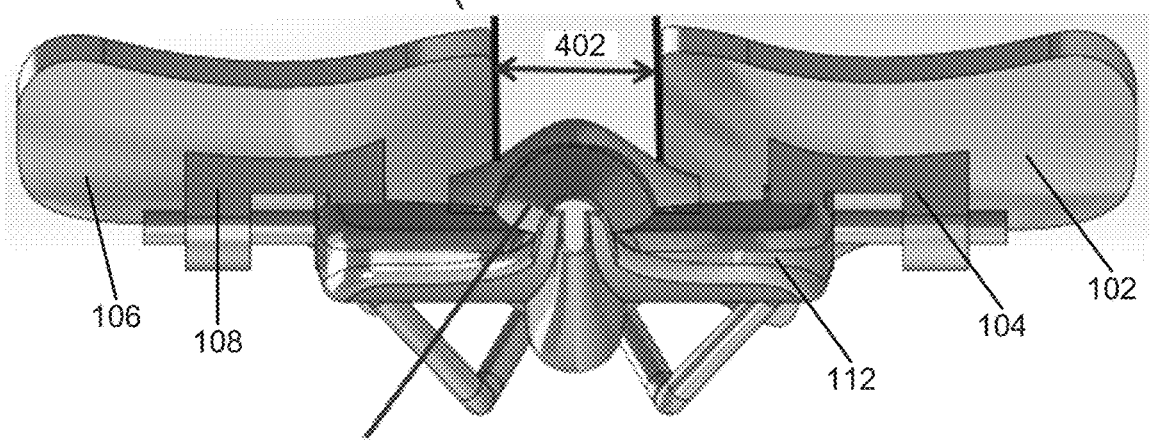
Figure 4C:
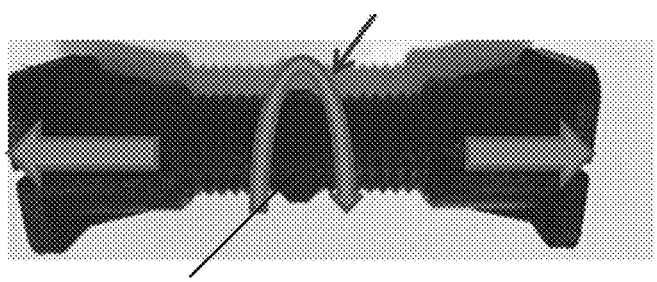
FIGS. 4C and 4D are plan views of a screw mechanism for adjusting seat elements, according to one embodiment.
Figure 4D:

Users can adjust the seat elements, for example, the separation between the seat elements. Separation of the seat elements 102, 106 can be adjusted to accommodate the geometry of pelvis and to relieve the strain on the pelvic symphysis cartilage. FIG. 4A is a perspective view of the example seat 100. As previously described, the seat elements 102, 106 have concave surfaces. The distance 401 is the distance between the portions of the seat element 102 that support the ischial tuberosities—IT's. The distance 401 can be adjusted to accommodate the geometry of pelvis. FIG. 4B is a perspective view of the example seat 100. The distance 402 is the lateral separation between the opposing edges of the seat elements 102, 106. The lateral separation 402 can be adjusted to substantially eliminate the strain on the pelvic symphysis cartilage that holds together the pelvic arch. Separation strain is caused by traditional convex bicycle seat surfaces by spreading apart the IT's. In FIG. 4B, the seat elements 102, 106 are more widely separated than in FIG. 4A.

In the example of FIG. 4, the seat 100 includes a mechanical screw separation mechanism 410 that can be maneuvered to adjust the distances 401, 402. FIGS. 4C and 4D are plan views of the mechanical screw separation mechanism 410 in an expanded state (wider separation of seat elements) and a compressed state (narrow separation of seat elements), respectively. In the illustrated example, switching between different states of the mechanical screw separation mechanism 410 can be adjusted by rotating the center screw 412. Rotating the center screw 412 clockwise (or counter-clockwise) expands (or compresses) the mechanical screw separation mechanism 410 which in turn increases (or decreases) the distances 401, 402.

Figure 5:
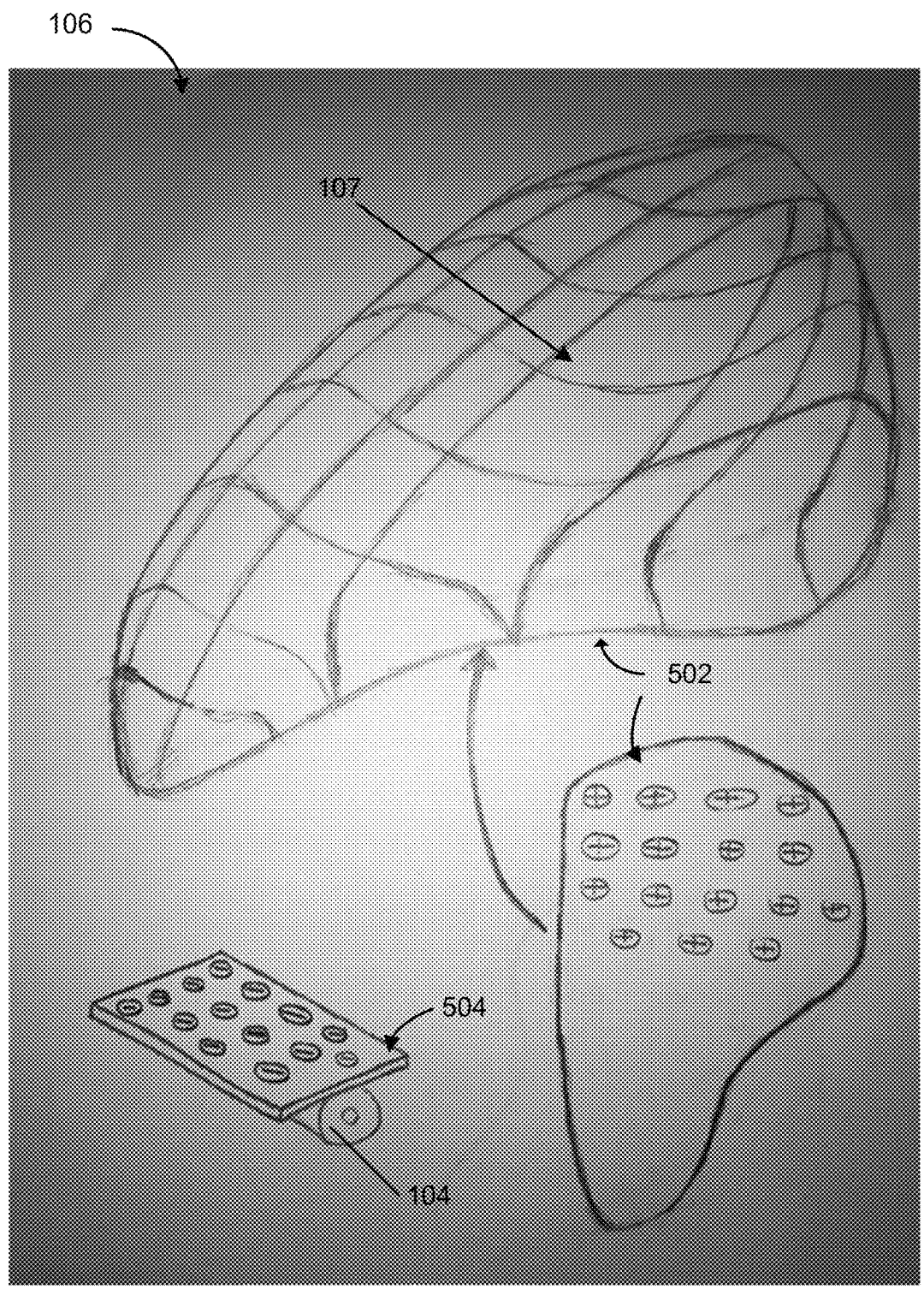
FIG. 5 illustrates adjusting a seat element using velcro, according to one embodiment.

In some embodiments, in a seat element 102 (106), the relative position of the pivot 110 (or 112) can be adjusted. FIG. 5 illustrates adjusting the relative position of the pivot 104 in the seat element 106. As illustrated, there is Velcro between the seat surface 107 and the pivot 104. A bottom 502 of the seat surface 107 includes male Velcro (+) and the top surface of the pivot 104 includes female Velcro (−). The pivot 104 can be separated from and attached to the seat surface 107 via the Velcro. When attached, the top surface 504 of the pivot 104 contacts the bottom surface 502 of the seat surface 107. Adjusting the relative position of the pivot 104 (or 108) in the seat element 102 (or 106) can in turn adjust the distances 401, 402. Separating the seat surface from the pivot further allows users to replace seat surfaces with different levels of contouring. Modular seat elements offer flexibility and customization. Users can install different seat elements on a support frame.

Figure 6:
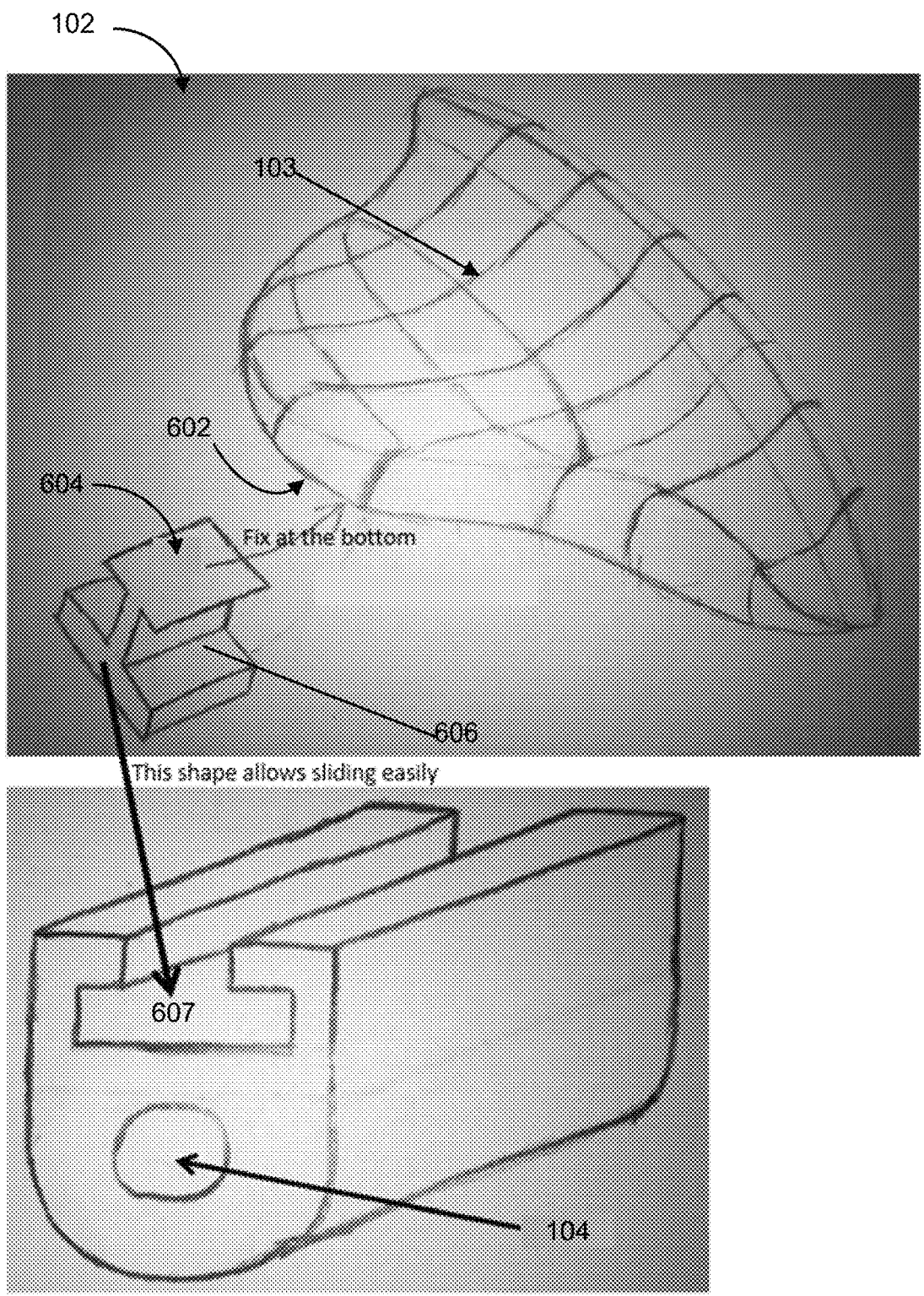
FIG. 6 illustrates adjusting a seat element using a slider, according to one embodiment.

In some embodiments, sliders are used to adjust separation of the seat elements 102, 106. FIG. 6 illustrates adjusting the relative position of the pivot 104 in the seat element 102 via a slider 604. As illustrated, the bottom surface 602 of the seat surface 103 includes a slider 606. Specifically, the top surface 604 of the slider 606 is secured to the bottom surface 602 of the seat surface 103. The pivot 104 includes a groove 607 for receiving the slider 606. By sliding the slider 606 in the groove 607, the relative position of the pivot 104 can be adjusted. Adjusting the relative position of the pivot 104 (or 108) in the seat element 102 (or 106) can in turn adjust the distances 401, 402.

In some embodiments, a sliding mechanism is used to adjust separation of the seat element 102, 106. FIGS. 7A through 7C illustrate adjusting the relative position of the pivot 104 relative to the support frame 112. In the illustrated example, only the shaft of the support frame 112 is shown. As illustrated in FIG. 7C, three screws 701 can be secured to compress the boring of the pivot 104 on the support frame thereby to interlock the pivot 104 to the support frame 112. Releasing the three screws 701 allow the pivot 104 to slide along the support frame 112 thereby to adjust the distances 401, 402. For example, compared to the seat element's 102 position in FIG. 7A, the seat element 102 is further away from the center of the support frame 112 in FIG. 7B.

Seat Transmission

In various embodiments, the seat elements 102, 106 counter-pivot. That is, the seat elements 102, 106 pivot in opposite directions. The support frame 112 includes a transmission system that counter-pivots the seat elements 102, 106. The purpose of the counter-pivot is to: 1) mimic the natural movement cycle of the legs during cycling, and 2) provide an opposing reaction such that the user does not slide out of the seat unintentionally (action/reaction). In various embodiments, the transmission system can include a differential, a mechanical linkage, or a cable linkage. During cycling, when one leg pedals downward, the other leg pedals upward. The contour of the seat surfaces corresponding to the upward moving leg provides most of the forward stability. By counter-pivoting the seat elements, forward slippage of the pelvis is reduced. This provides additional pelvic stability during the rotation cycle.

Figure 8B:
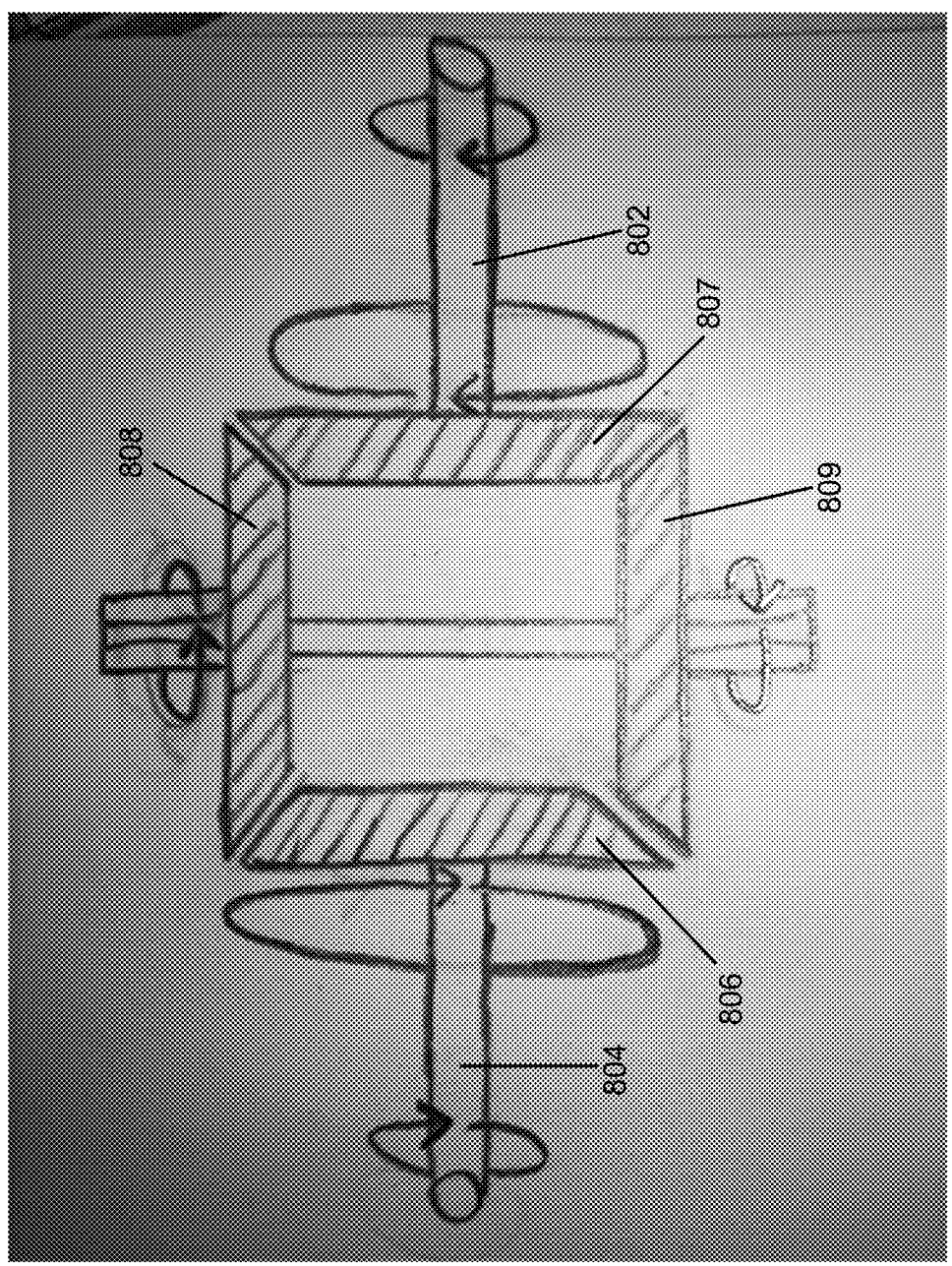

FIGS. 8A and 8B illustrate the seat 100 including a differential 800 for counter-pivoting seat elements 102, 106. The support frame 112 includes the differential 800 as a part of a transmission system. The support frame 112 also includes shafts 802, 804 that drive rotation of the seat elements 102, 106, respectively. The differential 800 couples and counter-rotates the shafts 802, 804. Specifically, the co-axial gear trains 806-809 counter rotate the shafts 802, 804. The counter-rotation of the shafts 802, 804 counter-pivots the seat elements 102, 106. FIG. 8B is an enlarged view of the differential 800.

Figure 9A:
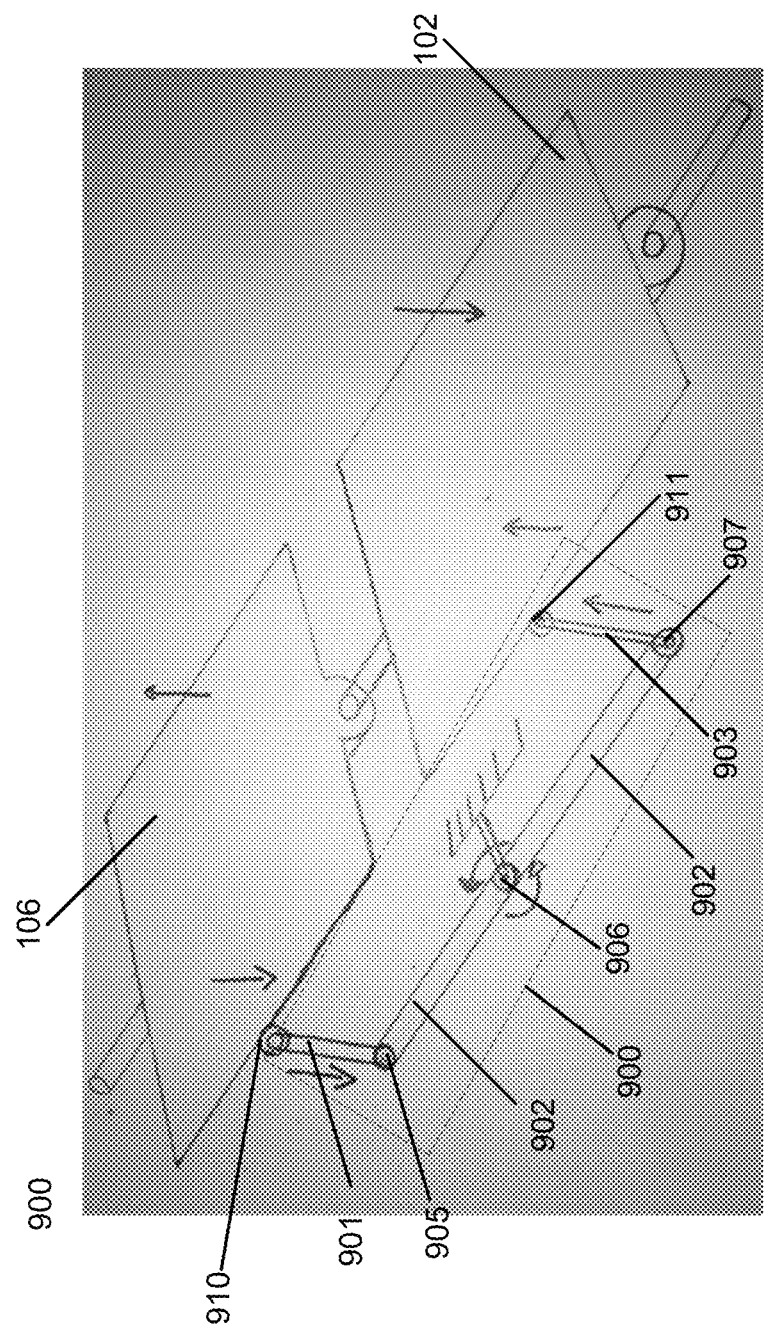
FIGS. 9A-9D illustrate a mechanical linkage for counter-pivoting seat elements, according to one embodiment.

FIG. 9A is a line drawing illustrating a mechanical linkage 900 for counter-pivoting seat elements 102, 106. The support frame 112 includes the mechanical linkage 900 as a part of a transmission system. The illustrated mechanical linkage 900 includes bodies 901-903 connected at joints 905, 907. The body 901 is connected to the seat element 106 via the joint 910, and the body 903 is connected to the seat element 102 via the joint 911. The bodies 901 and 903 move in opposite directions due to the pivot 906. In the illustrated example, the joints 905 and 907 are sliders. The joints 910 and 911 are hinges.

Figure 9B:
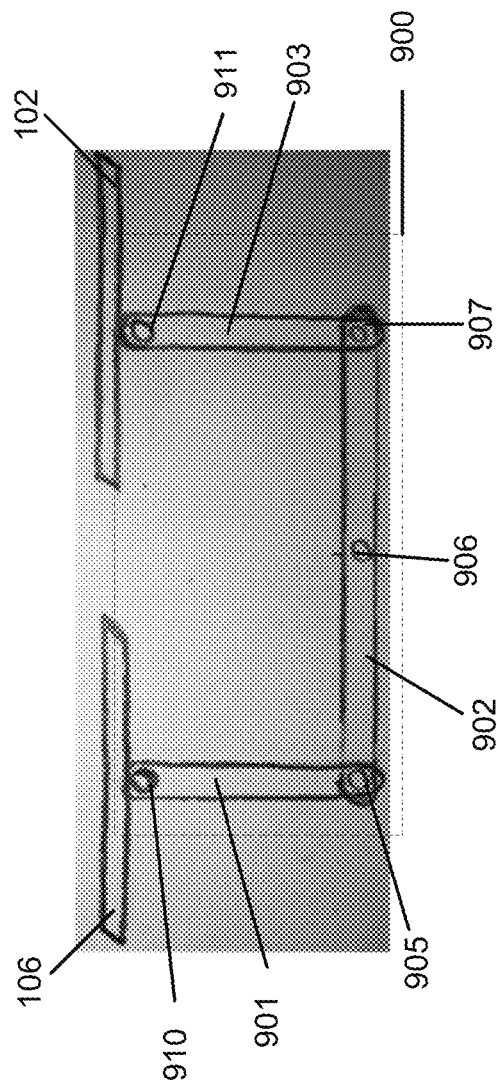
Figure 9C:
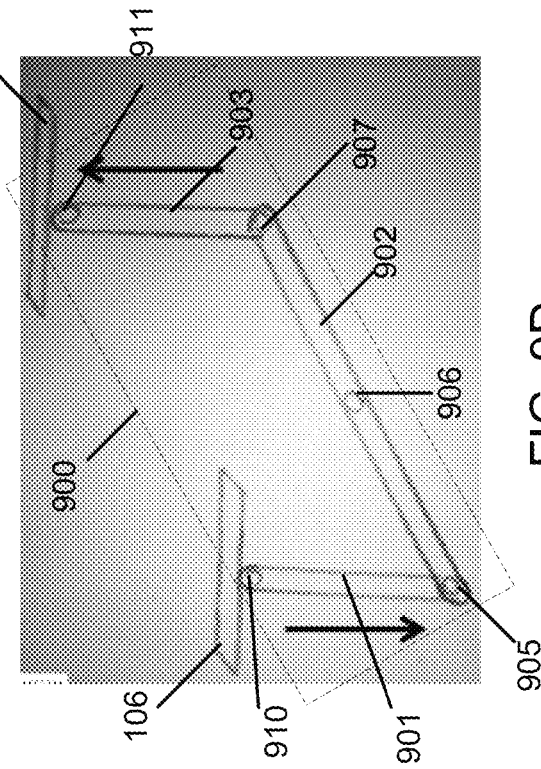
Figure 9D:
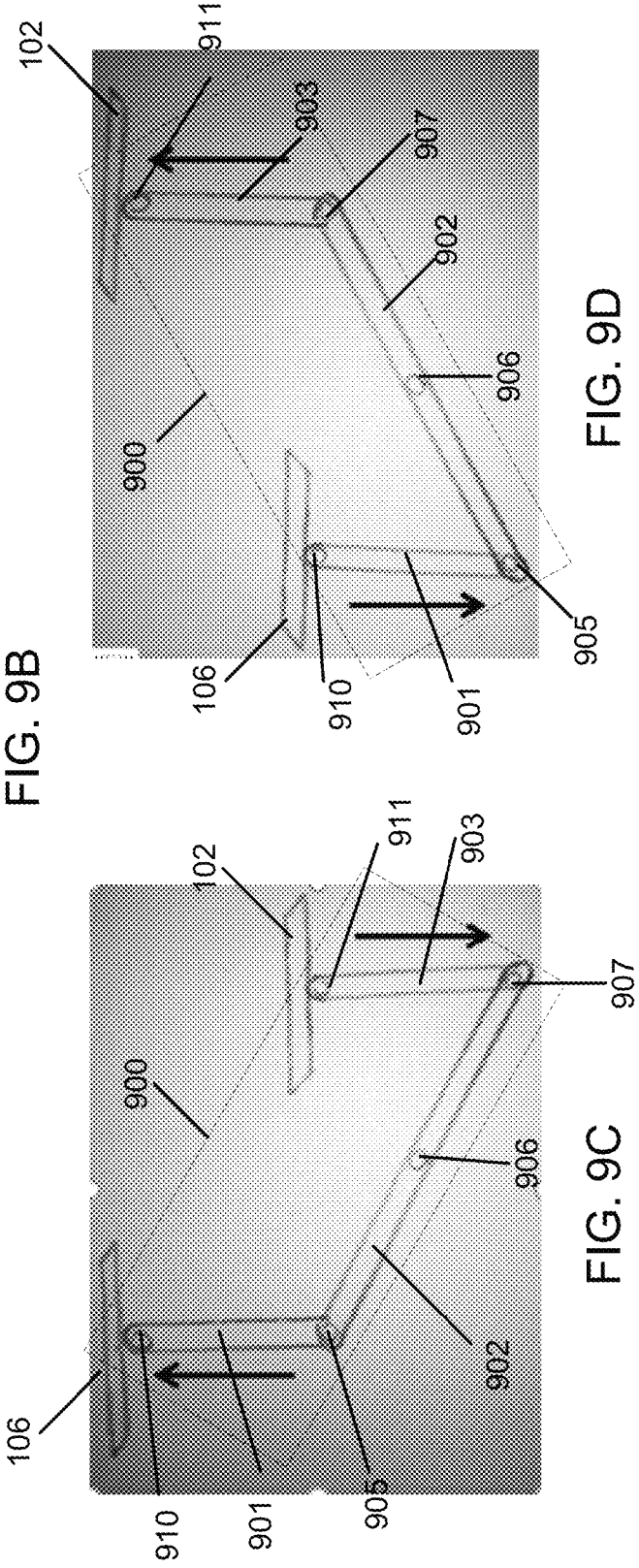

FIGS. 9B-D illustrate different positions during operation of an example mechanical linkage 900. FIG. 9B illustrates a "neutral" position of the mechanical linkage 900. The bodies 901, 903 are substantially vertically overlapping with each other. The seat elements 106, 102 are substantially in the same plane that is parallel to the ground. FIG. 9C illustrates one extreme pivoting state of the mechanical linkage 900. The body 901 is more elevated than the body 903. The body 901 moves upward and the body 903 moves downward, which counter-pivots the seat elements 106, 102. Similarly, FIG. 9D illustrates the opposite pivoting state of the mechanical linkage 900. The body 901 is less elevated than the body 903. The body 901 moves downward and the body 907 moves upward, which counter-pivots the seat elements 106, 102.

Figure 10:
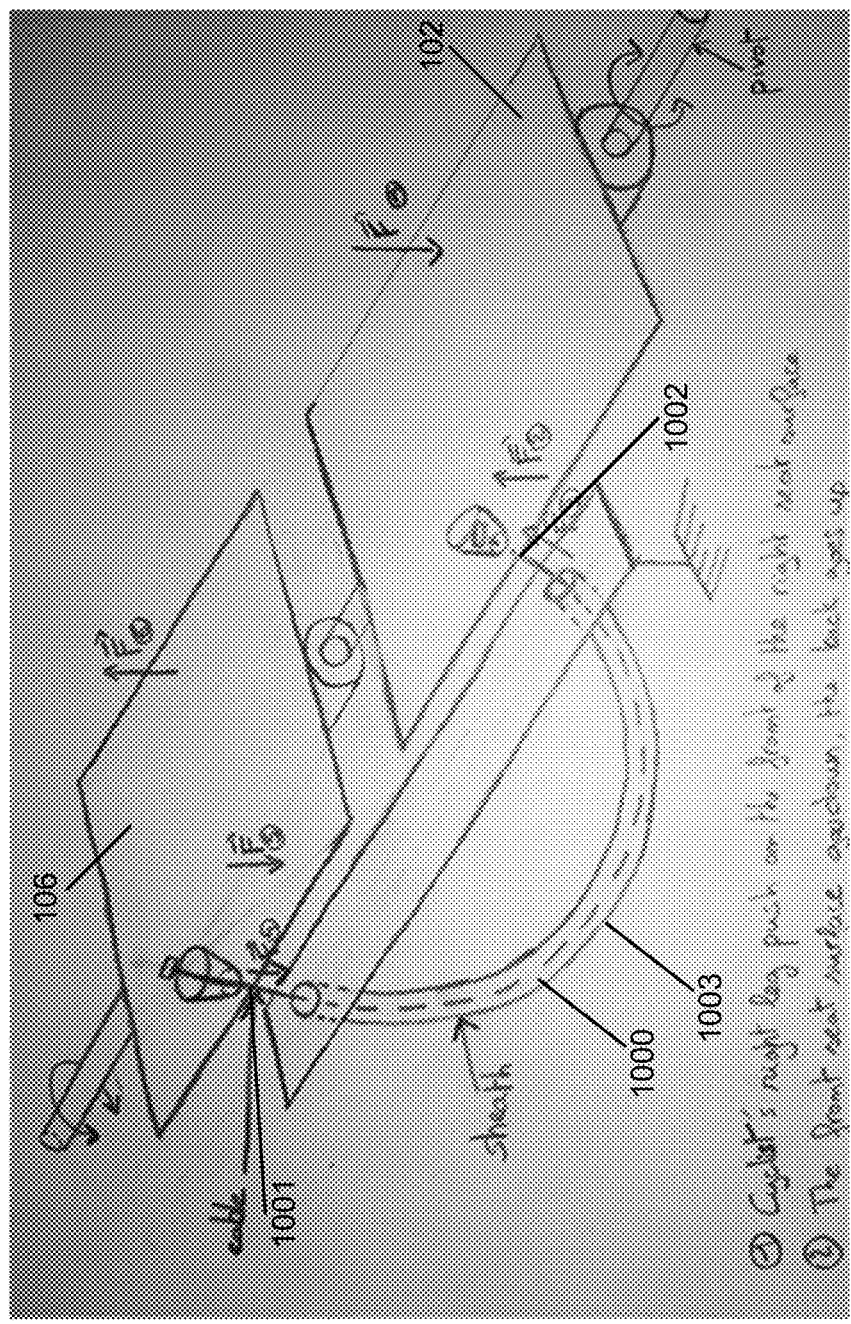
FIG. 10 illustrates a cable linkable for counter-pivoting seat elements, according to one embodiment.

FIG. 10 illustrates a cable linkable 1000 for counter-pivoting seat elements 102, 106. The terminal 1001 (1002) of the cable linkage 1000 is connected to the bottom surface of the seat element 106 (102). The cable 1000 may be enclosed in a sheath 1003. When a user's right leg pushes downward on the front portion of the seat element 102, the seat element 102 moves downward and pivots forwards. The cable 1000 causes the seat element 106 to move upward and pivot backwards.

Tilt Adjustment

In some embodiments, a tilt of the seat elements can be adjusted by a rider. The tilt of the seat surfaces can be adjusted to reposition a user's pelvis if the user adjusts posture. FIGS. 11A-11C illustrate adjusting a tilt of the seat surface. The tilt of the seat surface can be measured by the angle 1102 relative to the ground, which reflects the forward tilt of the body and pelvis. For example, the tilt pivots forwards (backwards) and the angle 1102 increases (decreases) for a more engaged and performance (relaxed and upright) posture. FIG. 11A shows a more upright posture and a less tilted seat. FIG. 11C shows a more aggressive posture and a more tilted seat. FIG. 11B in in between. As previously described, the seat includes a transmission system that can implement a variety of ways for counter-pivoting the seat elements. Adjusting the tilt of the seat elements is further described in connection with FIGS. 12 through 15. In various embodiments, the rider can adjust the tilt of a seat element during riding.

Figure 12A:
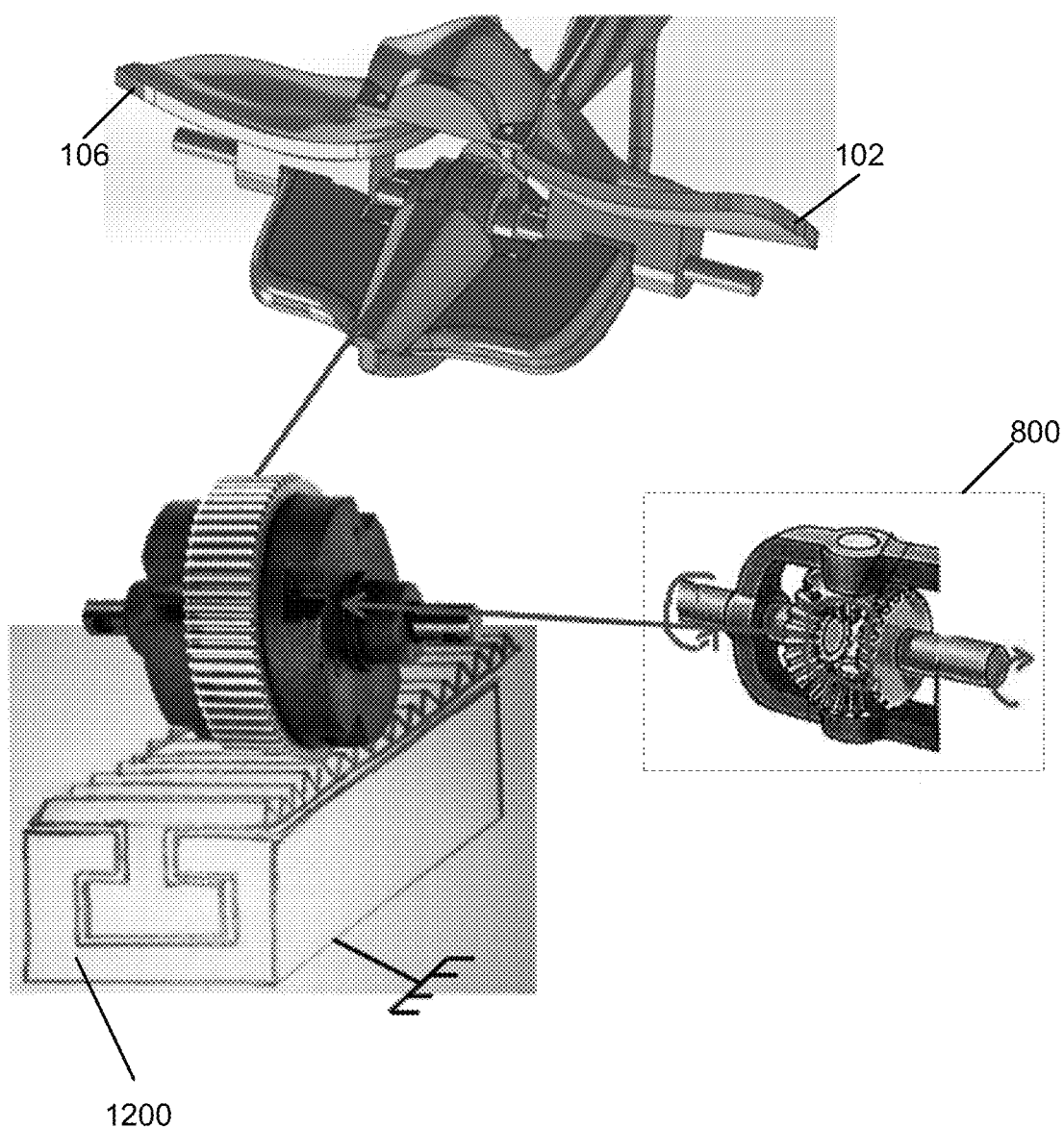
FIGS. 12A-12D illustrate adjusting a tilt of a seat element, according to one embodiment.
Figure 12B:
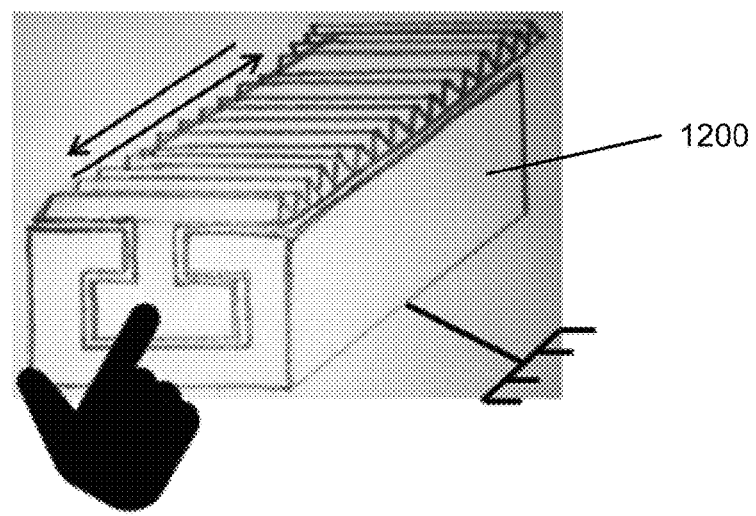
Figure 12C:
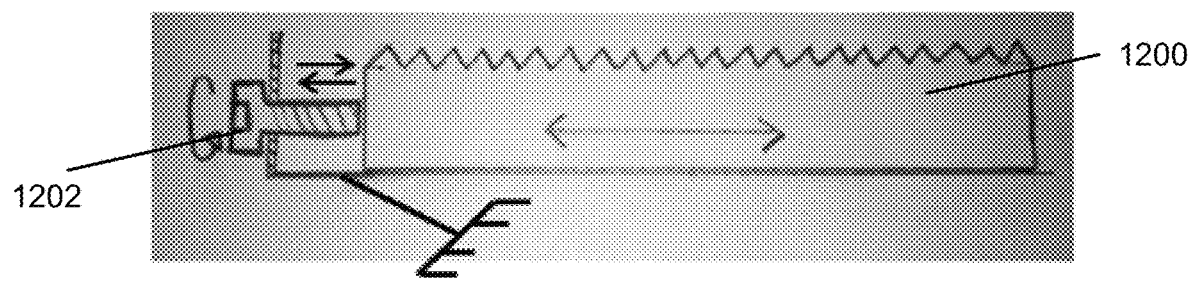
Figure 12D:
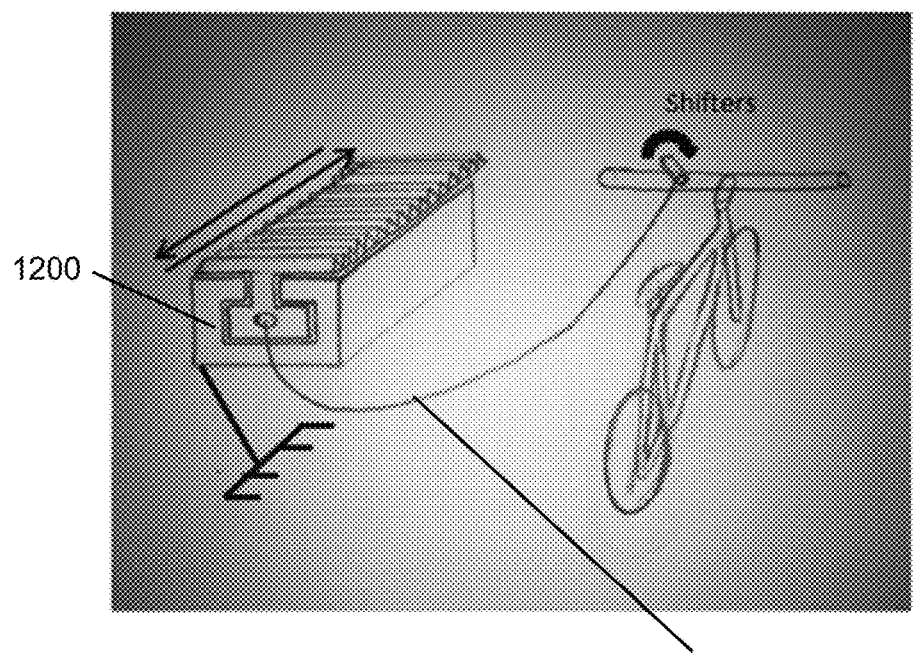

FIGS. 12A through 12D illustrate adjusting the tilt of a seat element in a transmission system including a differential. The differential 800 is coupled to a slider 1200. The position of the slider 1200 can be adjusted thereby to adjust the tilt of the seat element. The position of the slider 1200 can be adjusted by hand as illustrated in FIG. 12B. In other embodiments, the position of the slider 1200 can be adjusted by rotating a screw 1202 as illustrated in FIG. 12C. Tensioning or relaxing the cable 1204 can also adjust the position of the slider 1200 as illustrated in FIG. 12D. In some designs (such as in FIG. 12*d*), the tilt of the seat surfaces and/or the separation of the seat elements can be adjusted while the user is riding.

Figure 13:
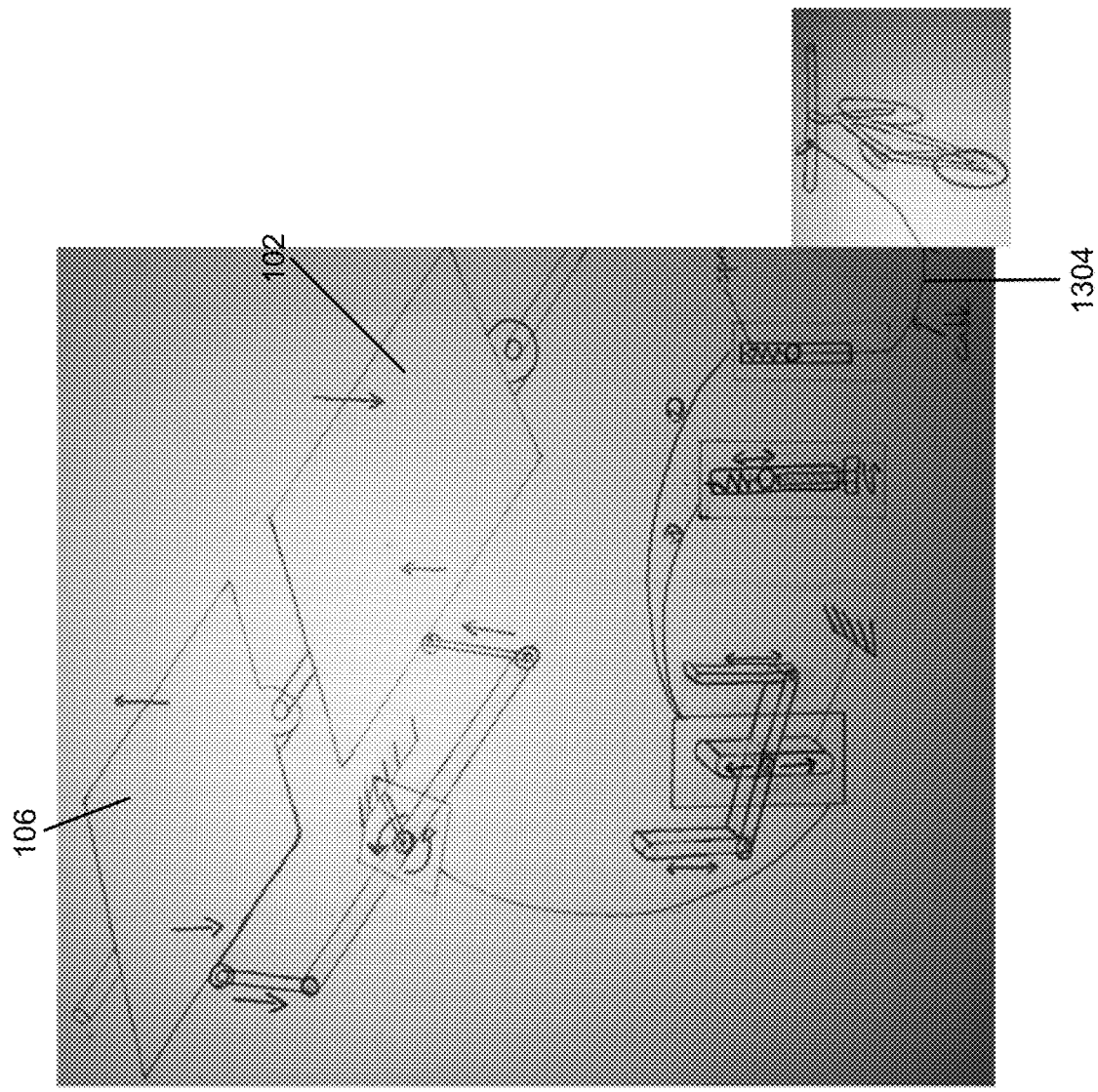
FIG. 13 illustrates adjusting a tilt of a seat element, according to one embodiment.

FIG. 13 illustrates adjusting the tilt of a seat element in a transmission system including a mechanical linkage. By tensioning cable 1304, the whole mechanism is pulled down. This implies that the seat pads 102, 106 tilt up to return to a horizontal position. On the other hand, relaxing the cable 1304 lets the whole mechanism rise up. This implies that the seat pads 102, 106 tilt down. A spring and a screw help to adjust the angle.

Additional Seat Adjustments

Figure 14E:
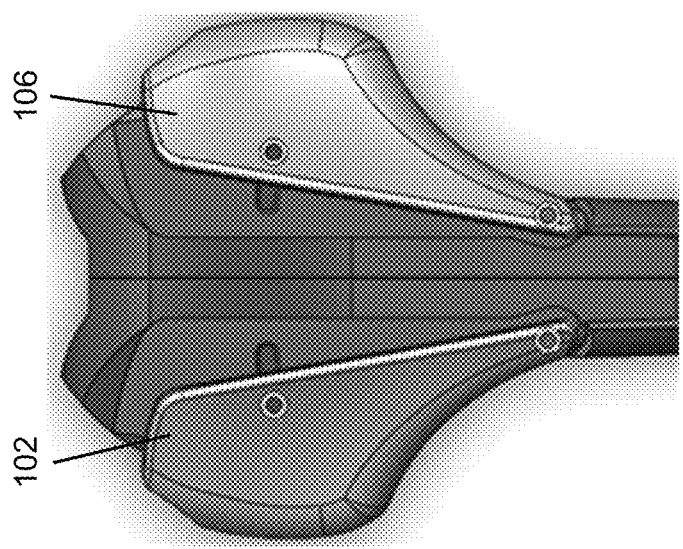
Figure 14D:
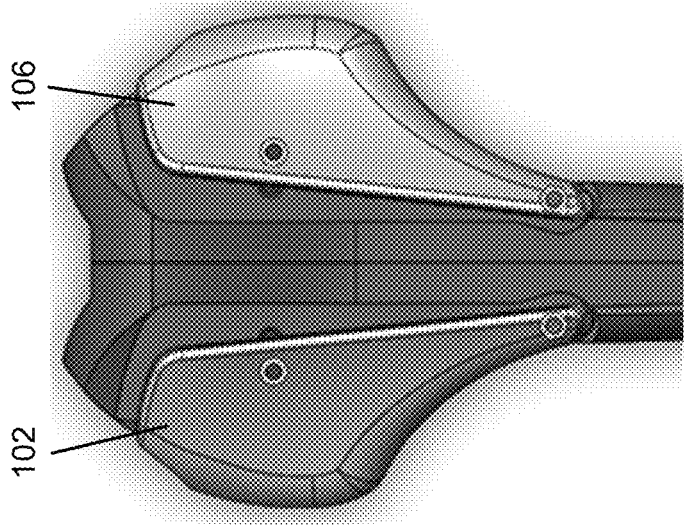
Figure 14C:
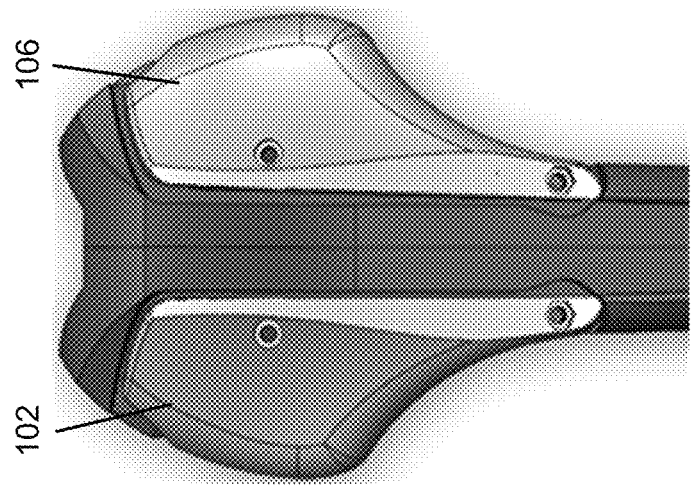

FIGS. 14A-14E illustrate adjusting a seat element, according to one embodiment. In this example, seat elements 102, 106 can be rotated to adjust their separation. FIG. 14A shows a top view of the seat and FIG. 14B shows the bottom view. In these figures, the seat element 102 can rotate about pivot point 1402. The position of the seat is fixed by a feature 1403 that travels along arc 1404. For example, feature 1403 may be a screw thread that aligns with slot 1404, with a bolt or other fastener fixing the position. This mechanism allows a fan-like motion, as shown in FIGS. 14C-14E. In FIG. 14C, the seat is configured for sit bones with a separation of 110 mm. The width of the seat is 132 mm. FIG. 14D is for 125 mm sit bones with a seat width of 147 mm. FIG. 14E is for 138 mm sit bones with a seat width of 160 mm.

Figure 15B:
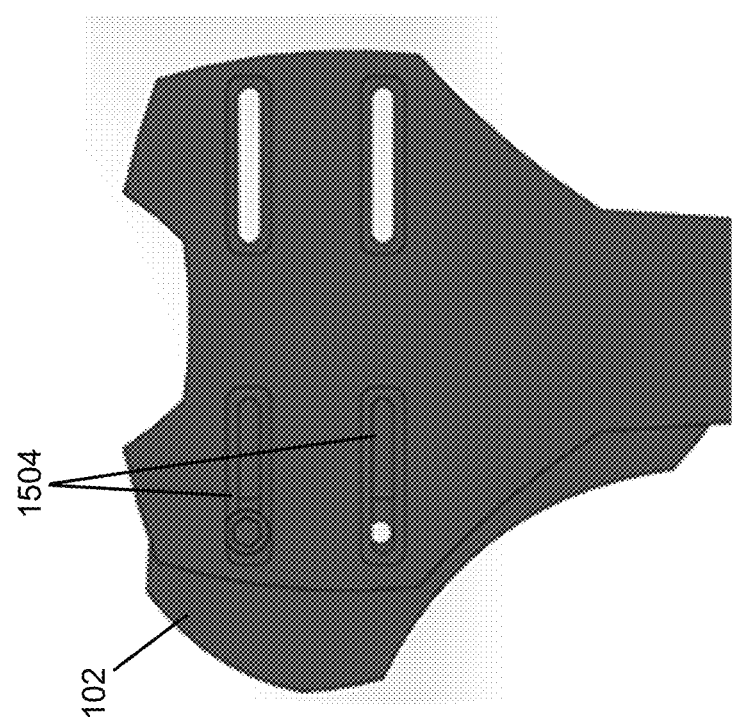
FIGS. 15A-15B illustrate adjusting a seat element, according to one embodiment.
Figure 15A:
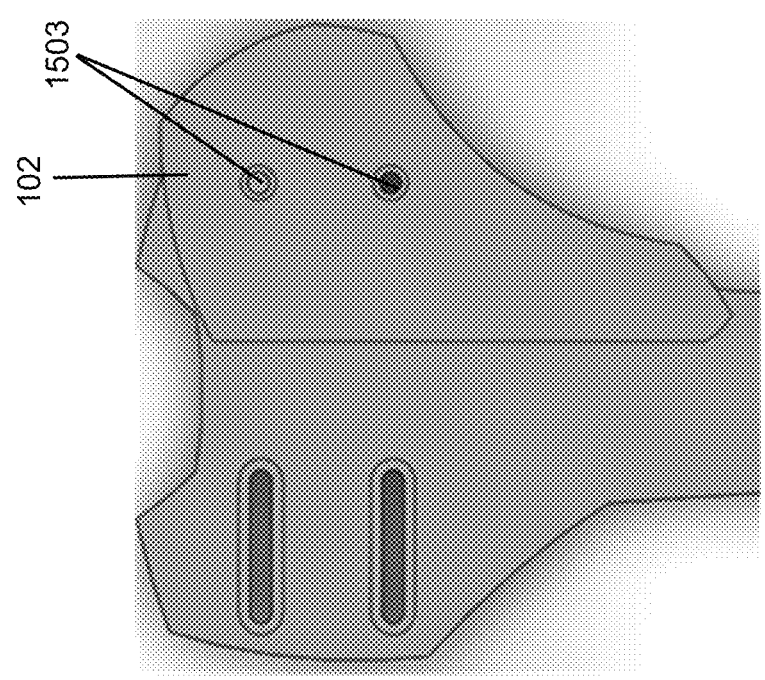

FIGS. 15A-15B and 16A-16B illustrate lateral adjustments of a seat element, according to additional embodiments. FIGS. 15A and 15B show top and bottom views of a seat with one seat element 102 installed. The lateral position of the seat element is adjustable along the direction of the slots 1504, i.e. along the right-left direction. The seat element 102 may contain screw threads 1503, with bolts used to fix the position of the seat element.

Figure 16C:
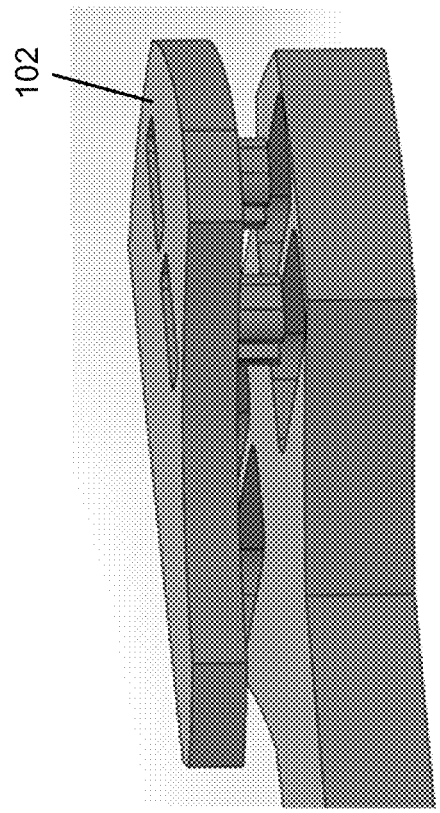
FIGS. 16A-16C illustrate adjusting a seat element, according to one embodiment.
Figure 16B:
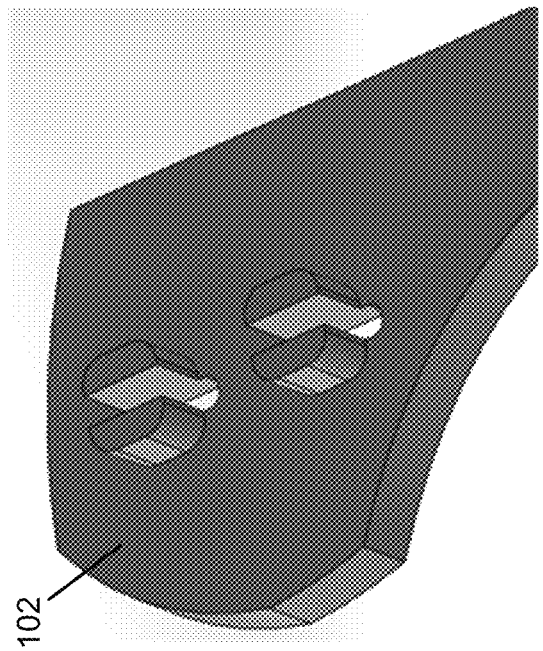
Figure 16A:
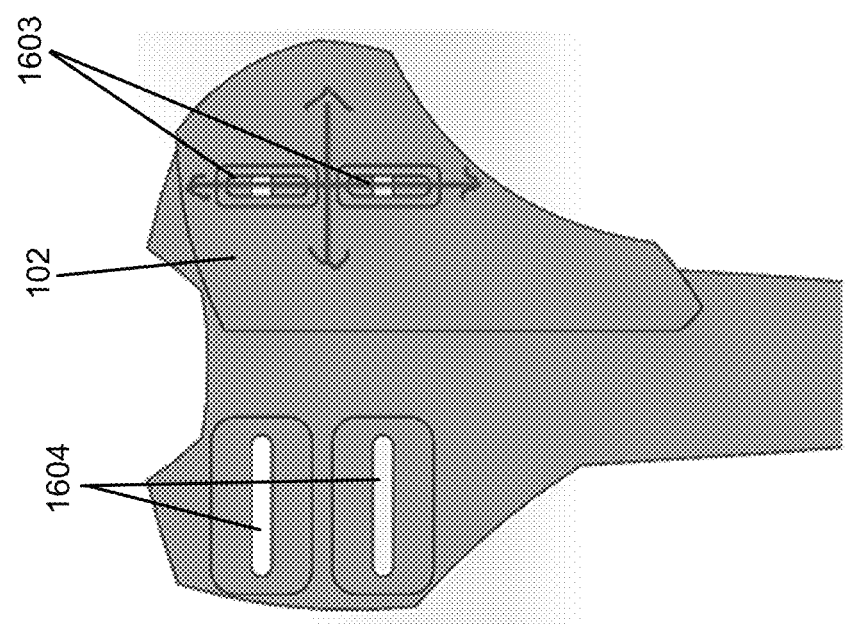

FIG. 16A shows a top view of another seat with one seat element 102 installed. FIG. 16B shows a bottom perspective view of the seat element 102. FIG. 16C is an exploded view of the seat. The lateral position of the seat element is adjustable along two dimensions. The bottom piece has two slots 1604 along one direction, and the seat element 102 has two corresponding slots 1603 along the perpendicular direction. This allows for adjustment along both directions.

Figure 17:
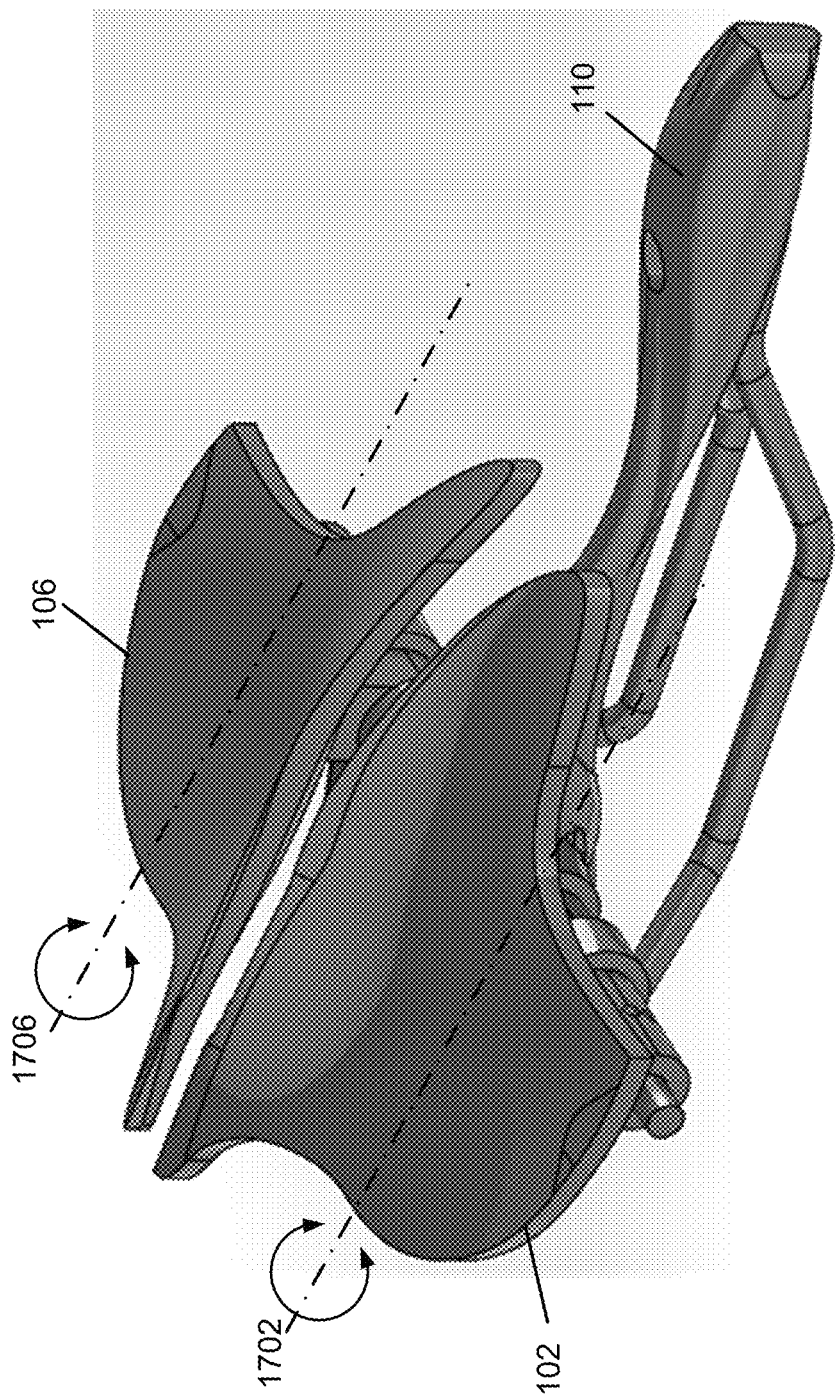
FIG. 17 illustrates adjusting a seat element, according to one embodiment.

Other adjustments are also possible. For example, as shown in FIG. 17, the seat elements 102, 106 may be rotated along an axis 1702, 1706 oriented along the forward-backward direction. That is, the seat elements may be rolled right or left. This may be used to raise or lower the center of the seat relative to the edges. If the right seat element 102 is rolled to the right while the left seat element 106 is rolled to the left, this will raise the center of the seat relative to the edges.

Body Stability and Alignment on the Seat

The nose 110 provides stability during cornering, and also guides the user into proper alignment and position on the seat surface. Cyclists rely on the nose of the bike during cornering and aggressive maneuvers to provide stability as the seat may come into contact with their inner thighs. The nose of the seat also provides a guide to properly alignment the body on the seat after repositioning or standing up in the pedals. The seat nose 110 and the seat surfaces 103, 107 form a gap below a user's perineum area. This gap relieves pressure and minimizes friction to the perineum area to prevent discomfort and chafing. In addition, the aerodynamic design reduces drag and increases airflow in the perineum area, improves comfort, and reduces moisture that causes related skin conditions. The design eliminates the need for padded bicycle shorts that tend to absorb and hold moisture and heat that causes discomfort and skin conditions. Soft materials may also be used in this gap region. This may give the illusion of a more traditional seat while still functioning the same with respect to pressure relief.

The seats described herein can also be used in other pedal-powered vehicles such as tricycles, unicycles, aircrafts, paddle boats, hydrocycles, and the like.

Although the detailed description contains many specifics, these should not be construed as limiting the scope of the invention but merely as illustrating different examples and aspects of the invention. It should be appreciated that the scope of the invention includes other embodiments not discussed in detail above. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

In the claims, reference to an element in the singular is not intended to mean "one and only one" unless explicitly stated, but rather is meant to mean "one or more." In addition, it is not necessary for a device or method to address every problem that is solvable by different embodiments of the invention in order to be encompassed by the claims.

What is claimed is:

1. A seat for a pedal-powered vehicle, comprising:
   a support frame; and
   a left seat element, a right seat element, and a nose; wherein each is implemented as a separate component supported by the support frame, and the left seat element and the right seat element are configured to support weight of a rider while the rider is seated, and wherein the left seat element and the right seat element are separated by a lateral distance to form a gap below a perineum area of the rider, and wherein the left seat element and the right seat element each comprises a pivotable portion that is configured to be caused by pedaling of the rider to be pivoted at a pivot axis, and the pivot axis is located longitudinally away from a center of gravity of the rider, thereby reducing pressure exerted on ischia tuberosties of the rider.

2. The seat of claim 1, wherein the lateral distance is adjustable by the rider.

3. The seat of claim 2, further comprising at least one of: a screw mechanism for adjusting the lateral distance and a slider mechanism for adjusting the lateral distance.

4. The seat of claim 1, wherein each seat element has a pivot point, and wherein the lateral distance is adjustable by the rider rotating a seat element about its pivot point.

5. The seat of claim 1, wherein the seat elements are movable laterally relative to each other.

6. The seat of claim 1, wherein each seat element includes a seat surface and a pivot surface, and wherein the seat surface and the pivot surface are movable laterally relative to each other.

7. The seat of claim 1, wherein the lateral distance is adjustable by the rider along two dimensions.

8. The seat of claim 1, wherein each seat element is configured to pivot backwards and forwards while the seated rider is pedaling.

9. The seat of claim 8, wherein the seat elements are counter-pivoting while the seated rider is pedaling.

10. The seat of claim 9, further comprising one or more of the following: a differential that counter-pivots the seat elements, a mechanical linkage that counter-pivots the seat elements, or a cable linkage that counter-pivots the seat elements.

11. The seat of claim 8, wherein the seat elements are designed such that the seat elements interfere with the seated rider's pedaling if the seat elements did not pivot.

12. The seat of claim 8, wherein a pivot axis for the seat elements is located behind the center of gravity.

13. The seat of claim 1, wherein each seat element includes a concave surface that supports the seated rider.

14. The seat of claim 1, wherein each seat element includes a front surface that is softer compared to a main support surface of the seat element.

15. The seat of claim 1, further comprising: a first seat padding coupled to the left seat element and a second seat padding coupled to the right seat element, the seat paddings configured to provide grip for the seated rider.

16. The seat of claim 1, wherein a tilt of a seat element is adjustable by the rider.

17. The seat of claim 16, wherein the tilt of the seat element is adjustable by the rider while riding.

18. The seat of claim 1, wherein a roll of a seat element is adjustable by the rider.

19. The seat of claim 1, wherein the seat elements are modular such that a different seat element is installable by the rider on the support frame.

20. The seat of claim 1, wherein the vehicle is a bicycle.

* * * * *